US008580339B2

(12) United States Patent
Ohanessian

(10) Patent No.: US 8,580,339 B2
(45) Date of Patent: Nov. 12, 2013

(54) COATING PROCESS FOR THE COATING OF AN INTERIOR OF A PIPEWORK SYSTEM AS WELL AS A SUB-DISTRIBUTOR AND A WORKING EQUIPMENT FOR THE TREATMENT OF A PIPEWORK SYSTEM

(75) Inventor: Roben Ohanessian, Unterengstringen (CH)

(73) Assignee: CEC-Systems SA, Unterengstringen (CH)

( * ) Notice: Subject to any disclaimer, the term of this patent is extended or adjusted under 35 U.S.C. 154(b) by 502 days.

(21) Appl. No.: 12/680,895

(22) PCT Filed: Aug. 18, 2008

(86) PCT No.: PCT/EP2008/060795
§ 371 (c)(1),
(2), (4) Date: Jul. 6, 2010

(87) PCT Pub. No.: WO2010/020273
PCT Pub. Date: Feb. 25, 2010

(65) Prior Publication Data
US 2010/0285204 A1    Nov. 11, 2010

(51) Int. Cl.
*B05D 7/22* (2006.01)
*C22C 16/00* (2006.01)

(52) U.S. Cl.
USPC ............................... 427/238; 427/230; 427/8

(58) Field of Classification Search
USPC ...................... 427/8, 238; 118/600, 663, 667; 137/625, 400
See application file for complete search history.

(56) References Cited

U.S. PATENT DOCUMENTS

| 5,680,877 | A | * | 10/1997 | Edstrand et al. | ............ 134/103.1 |
| 5,924,913 | A | * | 7/1999 | Reimelt | ............................ 451/36 |
| 7,510,662 | B1 | * | 3/2009 | Hansen | ............................ 210/805 |
| 2004/0035805 | A1 | * | 2/2004 | Hansen | ............................ 210/774 |
| 2004/0110450 | A1 | * | 6/2004 | Kruse | ............................ 451/37 |
| 2010/0304024 | A1 | * | 12/2010 | Ohanessian | ................. 427/238 |

FOREIGN PATENT DOCUMENTS

| DE | 39 02 366 A1 | 8/1990 |
| DE | 44 04 473 A1 | 9/1995 |
| DE | 195 13 150 C1 | 8/1996 |
| DE | 197 45 642 A1 | 4/1999 |
| EP | 1 647 780 A | 4/2006 |
| WO | WO 97/15406 A | 5/1997 |
| WO | WO 2008/088317 A | 7/2008 |

* cited by examiner

*Primary Examiner* — Dah-Wei D. Yuan
*Assistant Examiner* — Diane Zhang
(74) *Attorney, Agent, or Firm* — Kilpatrick Townsend & Stockton LLP

(57) ABSTRACT

A coating process for the interior of a pipework system, which includes a subsystem having a first part-system and a second part-system coupled to the first part-system, wherein the part-system can be pressurized by a pressure difference via a first connection of the first part-system and via a second connection of the second part-system, and wherein the first connection of the second part-system is identical to the second connection of the first part-system. In a second process step the first part-system is pressurized in such a way that a fluid-flow of the coating material is established through the first part-system and then the first connection of the second part-system is pressurized after the coating material leaves the second connection of the first part-system so that the first part-system and the second part-system is consecutively fed with the coating material.

10 Claims, 28 Drawing Sheets

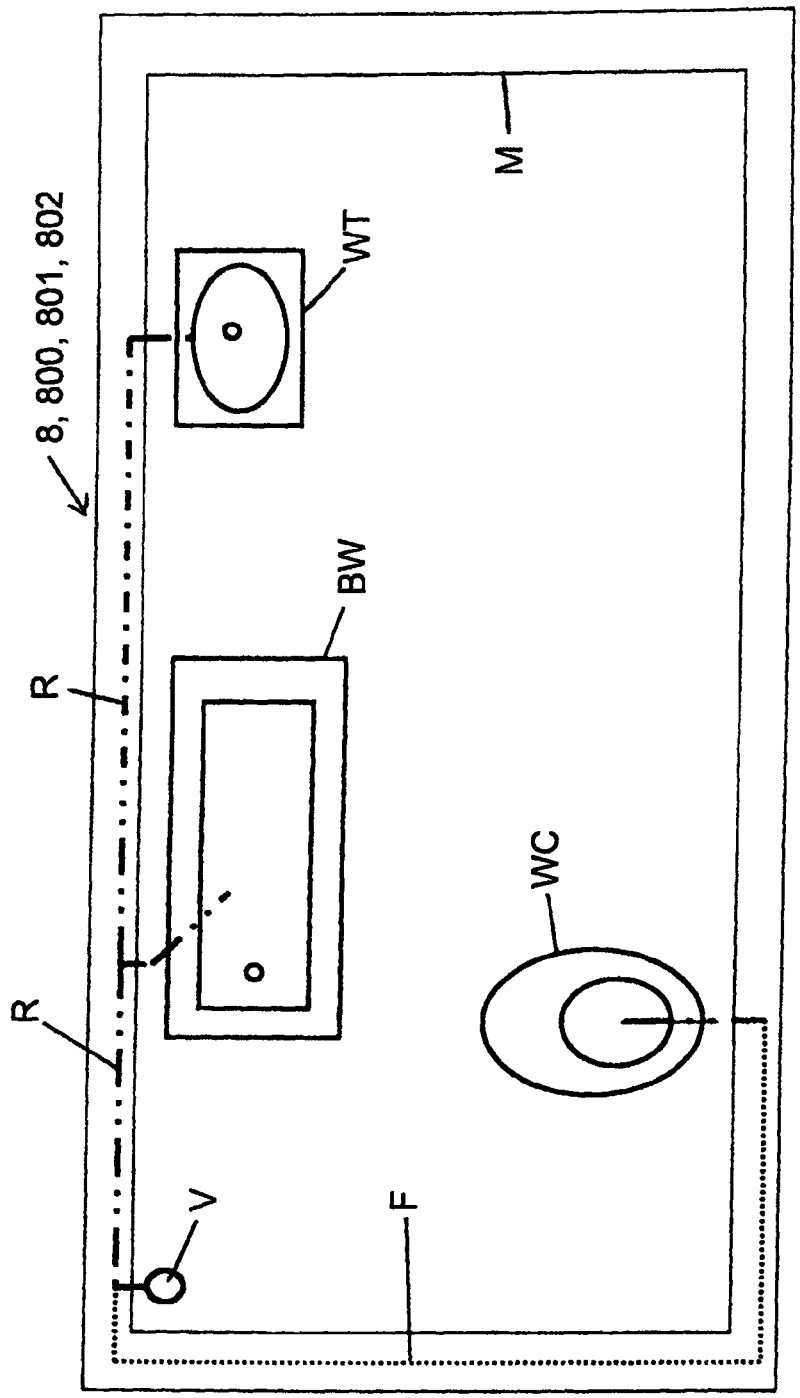

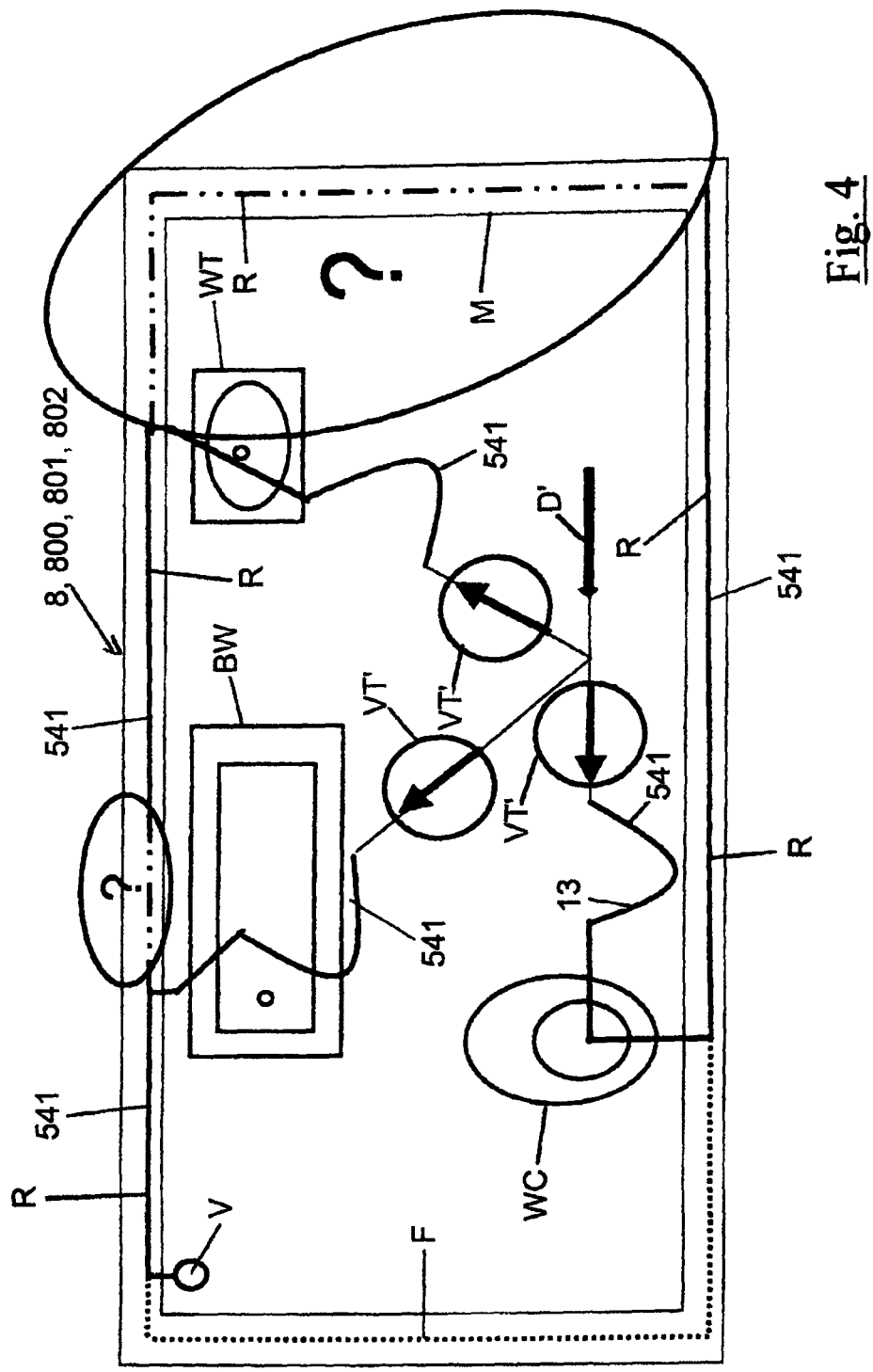

COATING PROCESS FOR THE COATING OF AN INTERIOR OF A PIPEWORK SYSTEM AS WELL AS A SUB-DISTRIBUTOR AND A WORKING EQUIPMENT FOR THE TREATMENT OF A PIPEWORK SYSTEM

CROSS-REFERENCE TO RELATED APPLICATIONS

This application is a National Stage of International Application No. PCT/EP2008/060795 filed Aug. 18, 2008, the disclosure of which is incorporated herein by reference.

BACKGROUND OF THE INVENTION

The invention relates to a coating process for the coating of an interior of a pipework system, as well as to a sub-distributor and a working equipment for the treatment of a pipework system in accordance with the preamble of the independent claim of the respective category.

Such processes are used for drying oxidizing or otherwise corroding water pipes in buildings, for derusting them by means of sand blasting, and for coating them subsequently with an epoxy resin coating or with an other plastic layer.

Mostly, water pipes of a building are subdivided in several pipelines. A typical example is a pipeline in a plumbing unit in an apartment or in a house. Water pipes for cold water constitute a first pipeline leading to a water-closet, a bathtub, a washbasin, and a shower. Water pipes for hot water leading to a washbasin, a bathtub, and a shower constitute a second pipeline. The water pipe for hot water is supplied by a hot water boiler. The pipes establishing the pipelines for hot water can corrode and rust, too. Further pipelines in houses and apartments are in the kitchen and in the laundry, are constituted by pipeline systems for heating installations and so on.

Nowadays, the most common application of known working processes is the coating of cold water pipes and pipelines in buildings. Regarding buildings, a frequently given coating problem is that no building plans for the sanitary pipeline system are available. And if such building plans are available, the pipes are very often installed different from that shown in the building plans. Regarding the coating processes known so far, this can have the consequence that some pipe sections are not coated. Later on, this problem will be highlighted with the help of FIG. 3 and FIG. 4. Regarding known processes, the still fluid coating material is blown into each connecting pipe, for example into the pipes for the toilet, the washbasin, and the bathtub at the same time. Thereby, an amount of coating material is blown into each connecting pipe which amount was determined from the length and the diameter of the pipes given in the building planes.

In case that the effective length of pipes is identical to the length determined from the building planes, it can be assumed that the coating is perfect. But it happens that the pipes used have an inner diameter which is completely or partly greater than assumed so that the calculated amount of coating material is not sufficient and a greater amount of coating material would be necessary for a perfect coating.

Also the contrary happens in practice, namely the amount of epoxy resin was calculated to much because the pipes are completely or partly thinner than assumed, or the length of the pipes is actually shorter than assumed, leading to that too much coating material is blown into a particular pipe section so that the inner surface of the pipe is coated too thick, or in an extreme example the pipe is clogged by the coating material.

Regarding the existing processes, there is no possibility to determine whether the pipeline is perfectly coated by the coating material, or whether the thickness of the coating has the preset reference value, respectively.

But also the preparation processes known from the state of the art which must be carried out beforehand the actual coating process have disadvantages not being eliminated until now.

Regarding this, the pipework system must be completely dewatered and dried in a first step. With regard to the known processes, after having drained the water being in the pipes at the lowest point, hot air is simply blown into the pipework system at one or more access points for a given period of time. Very often, in particular if the pipework system comprises a lot of bendings, the water is not completely drained since the water is retained in the bendings of the pipework system and, thus, is not blown out.

Strongly related problems are present at the following sand blasting of the pipework system. Regarding this, in particular the bendings are often only insufficiently cleaned by the sand blasting process or critical locations are reached not at all. In addition, the known processes have to work with high blasting pressures, in particular to get the problems at bendings under control, which, in case of thin or already strongly worn-out pipes, leads very often to the situation that the pipes are positively shot-through at the bendings by the sand blasting process, in turn leading to that the masonry in which the pipes are installed must be broken open, and the old pipes must be replaced by new ones, what actually should be avoided by the coating process.

Problems similar to the afore described in connection with the draining of the pipework system also consequently arise when dedusting the pipework system which must be done after the sand blasting process and before coating.

It is thus an object of the invention to suggest an improved coating process which renders possible to ensure in a controllable manner that all parts of the pipework system to be coated are coated having a preset thickness.

It is furthermore an object of the invention to provide an equipment with which the working process as well as the coating process can be carried out in a reliable, cost-effective, and simple way, preferably in a completely automated manner.

BRIEF SUMMARY OF THE INVENTION

The subject matters of the invention which satisfy these objects are characterized by the features of the independent claim of the respective category.

The respective depend claims relate to particularly advantageous embodiments of the invention.

Even if the invention is primary related to a coating process for the coating of an interior of a pipework system, in the framework of the present application a working process shall be described, too, which can be combined with the coating process in accordance with the invention in a particularly advantageous manner and which in particular can be carried out with the sub distributor according to the invention being also to be described thereinafter as well as with the working equipment including the sub distributor.

Hence, for reasons of clearness, at first a working process for the treatment of an interior of a pipework system shall be described, which pipework system includes a part-system between a first connection and a second connection, wherein the working process includes the following working steps: Providing a first working fluid being under an over-pressure with respect to an ambient pressure. Providing a second working fluid being under a low-pressure with respect to the ambient pressure. Thereby, the part-system is pressurized between the first connection and the second connection with the first working fluid provided under the over-pressure and the second working fluid provided under the low-pressure at the same time in such a way, that a fluid-flow of the first working fluid provided under the over-pressure is established through the part-system between the first connection of the part-system and the second connection of the part-system in a direction to the second working fluid provided under the low-pressure. Preferably, in at least one working step the direction of the fluid-flow through the part-system between the first connection and the second connection is reversed at least once.

Thus, it is essential for the new preferred working process that in at least one working step the direction of the fluid-flow through the part-system between the first connection and the second connection is reversed at least once. Because of that, on the one hand a reliable draining, drying, and dedusting of the pipework system to be renovated is possible for the first time, since in particular the residua in the bendings can be reliably removed. In addition, in particular the blasting process is much more gentle since it is blasted in both direction so that it can be worked with a smaller blasting pressure compared to the state of the art, and, nevertheless, the bendings of the pipework system are reliably cleaned.

The pipework system is in particular a networked pipework system including at least two networked sub-systems, preferably being networked by means of a networking-pipe, in particular by an uptake pipe or by a down pipe and the networked sub-systems preferably including at least one part-system, wherein the sub-systems includes at least one second part-system being connected to a first part-system.

In practice, the pipework system often includes a plurality of sub-systems, being preferably established in a plurality of floors of a building. Preferably, for each sub-system a main-distributor is provided which main-distributor provides the first working fluid and/or the second working fluid to the attached sub-system, and wherein the main-distributor is in particular a staircase-air-distributor.

Thereby, a sub-distributor is provided within each sub-system, with the sub-distributor making the first working fluid and/or the second working fluid available to the part-system of the sub-system, wherein the sub-distributor is in particular an air-distributor for a plumbing unit and/or wherein the sub-distributor is preferably designed in such a way that the first working fluid or the second working fluid can be made alternatively and switchably available to an outlet of the sub-distributor, wherein the first working fluid and/or the second working fluid is made available to the sub-distributor preferably via the main-distributor.

In practice, the first working fluid being provided under the over-pressure is provided by a compressor, in special cases in which a compressor cannot be used, it is provided by a over-pressure reservoir and/or the second working fluid being provided under the low-pressure is provided by a vacuum machine or by a low pressure reservoir.

Even if in practice due to cost requirements the first working fluid and the second working fluid is simply air, it is also possible to use a gas, for example oxygen or nitrogen, or an inert gas such as for example a noble gas or an organic gas, for example in order to dissolve organic residues within the pipework system.

Preferably, an air control station is provided for adjusting and/or regulating the over-pressure and/or a water separator and/or a cyclone filter for separating a fluid is provided, in particular for separating water, an oil, an epoxy resin and/or for separating particles, in particular abrasive particles, especially sand and/or for separating an other environment-friendly or not environment-friendly material.

In principle, the pipework system to be renovated can be any pipework, for example, but not only, a pipework system of a building, in particular a cold water pipework system, a hot water pipework system, a circulation pipework system, a pipework system for a heating installation, in particular a floor heating installation, a gas pipework system, a wastewater pipework system, a water pipework system for a roof, a pipework system for a swimming-pool, a pipework system for pressurized air, a pipework system for distributing oil, and/or the pipework system is a pipework system for an industrial facility, in particular a pipework system for wastewater, gas, oil, petroleum, crude oil, diesel oil, gasoline, chemical products, or for other industrial gases, industrial fluids or industrial solids, and/or wherein the pipework system is a public pipework system for pipelining one of the aforementioned fluids, other fluids, or solids.

For operating the new advantageous working process in an efficient manner, the entire pipework system is networked at least with all main-distributors and/or with all sub-distributors and/or with all air control stations and/or with all water separators and/or with all cyclone filters before starting the working process.

The working process can be operated in a particularly efficient way by providing an electronic data processing installation and by designing at least some of the main-distributors and/or of the sub-distributors and/or of the air control stations and/or of the water separators and/or of the cyclone filters in such a way that the working process can be at least partly carried out automatically and/or program-controlled.

Regarding a special embodiment, the new working process is a preparation process for draining and/or the desiccation of the pipework system, which preparation process includes the following steps: providing a first preparation fluid, in particular air, which first preparation fluid is under the preparation over-pressure with respect to the ambient pressure. Providing a second preparation fluid, in particular air, which second preparation fluid is under the preparation low-pressure with respect to the ambient pressure. Thereby, in a first preparation step the part-system is pressurized at the same time via the first connection with the first preparation fluid provided under the preparation over-pressure and via the second connection with the second preparation fluid provided under the preparation low-pressure in such a way that a fluid-flow of the first preparation fluid is established through the part-system between the first connection of the part-system and the second connection of the part-system in a direction from the first connection to the second connection in such a way, that the part-system is pre-emptied from a procedural matter, in particular from water. In a second preparation step the part-system is pressurized at the same time via the first connection with the second preparation fluid provided under the preparation low-pressure and via the second connection with the first preparation fluid provided under the preparation over-pressure in such a way that the direction of the fluid-flow through the part-system between the first connection and the second connection is reversed so that the part-system is post-emptied from a residual remain of the procedural matter.

When performing in the first part-system the first preparation step and the second preparation step, preferably at least one connection of the second part-system is disconnected from the first preparation fluid and from the second preparation fluid.

After the first part-system, the second part-system is in practice often at first pre-emptied and subsequent to that post-emptied.

For blowing out the part-system after the pre-emptying and the post-emptying of the part-system, all connections of all part-systems of the sub-system are advantageously pressurized for a preset blowing-out period by the first preparation fluid being provided under the over-pressure.

Very often, at least two coupled subsystems are present being coupled to each other by a networking-pipe and the networking-pipe and the sub-systems, being successively pre-emptied and post-emptied, are subsequently pressurized and blown out by the preparation fluid for the preset blowing-out period.

After the entire pipework system is emptied, the pipework system should be dried during a preset bake-out period at a preset temperature, preferably at 37° for ca. 45 min. by using a bake-out medium, in particular by using hot air.

Regarding a further preferred embodiment, the working process in accordance with the invention is a blasting process, in particular a mechanically abrasive blasting process, preferably a sand blasting process for blasting the pipework system, which blasting process includes the following steps: Providing a first blasting fluid comprising a blasting means, in particular an air-sand mixing with sand, which first blasting fluid is under the blasting over-pressure with respect to the ambient pressure. Providing a second blasting fluid, in particular air, which second blasting fluid is under the blasting low-pressure with respect to the ambient pressure, wherein in a first blasting step the part-system is pressurized at the same time via the first connection with the first blasting fluid provided under the blasting over-pressure and via the second connection with the second blasting fluid provided under the blasting low-pressure in such a way that a fluid-flow of the first blasting fluid is established through the part-system between the first connection of the part-system and the second connection of the part-system in a direction from the first connection to the second connection in such a way, that an inner surface of the part-system is pre-blasted and that in a second blasting step the part-system is pressurized at the same time via the first connection with the second blasting fluid provided under the blasting low-pressure and via the second connection with the first blasting fluid provided under the blasting over-pressure in such a way that the direction of the fluid-flow through the part-system between the first connection and the second connection is reversed, so that the part-system is successively in two opposite directions at first pre-blasted and then post-blasted with the blasting means.

The blasting process, for example for the cleaning of copper pipes, can be performed by using abrasive particles, especially by using sand having a grain size of 0.1 mm to 0.3 mm.

Galvanized pipes can be advantageously blasted by using abrasive particles, preferably sand having a grain size of 1 mm to 2.3 mm, wherein for example waste pipes can be blasted by using abrasive particles, preferably sand having a grain size of 3 mm to 5 mm.

When performing in the first part-system the first blasting step and the second blasting step, preferably at least one connection of the second part-system is disconnected from the first blasting fluid and from the second blasting fluid, wherein after having blasted the first part-system, the second part-system is for example at first pre-blasted and subsequent to that post-blasted.

Mostly, at least two coupled sub-systems are provided being coupled to each other via a networking-pipe, wherein after having blasted all part-systems of the first sub-system, at first the networking-pipe is blasted and subsequently the further sub-system is blasted.

After the blasting of the pipework system, a dedusting process is advantageously applied for dedusting it, including the following steps: Providing a first dedusting fluid, in particular air, which first dedusting fluid is under a dedusting over-pressure with respect to the ambient pressure. Providing a second dedusting fluid, in particular air, which second dedusting fluid is under the dedusting low-pressure with respect to the ambient pressure. Thereby, in a first dedusting step the part-system is pressurized at the same time via the first connection with the first dedusting fluid provided under the dedusting over-pressure and via the second connection with the second dedusting fluid provided under the dedusting low-pressure in such a way that a fluid-flow of the first dedusting fluid is established through the part-system between the first connection of the part-system and the second connection of the part-system in a direction from the first connection to the second connection in such a way, that the part-system is pre-dedusted from the blasting means, in particular from sand. And in a second dedusting step the part-system is pressurized at the same time via the first connection with the second dedusting fluid provided under the dedusting low-pressure and via the second connection with the first dedusting fluid provided under the dedusting over-pressure in such a way that the direction of the fluid-flow through the part-system between the first connection and the second connection is reversed, so that the part-system is post-dedusted from a residual remain of the blasting means.

When performing in the first part-system the first dedusting step and the second dedusting step, preferably at least one connection of the second part-system is disconnected from the first dedusting fluid and from the second dedusting fluid, wherein after the first part-system, the second part-system is especially at first pre-dedusted and subsequent to that post-dedusted.

For dedusting the part-system after the pre-dedusting and the post-dedusting of the part-system, all connections of all part-systems of the sub-system are advantageously pressurized for a preset blowing-out period by the first dedusting fluid being provided under the over-pressure.

The at least two coupled sub-systems being connected to each other via the networking-pipe and being successively pre-dedusted and post-dedusted, are subsequently pressurized and blown-out by the dedusting fluid for the preset blowing-out period.

After the entire pipework system is dedusted, the pipework system is particularly advantageously heated up during a preset bake-out period at a preset temperature, preferably at 37° for ca. 45 min. by using a bake-out medium, in particular by using hot air, and/or the pipework system is during the first dedusting step and/or during the second dedusting step dedusted and heated-up by the first dedusting fluid, which first dedusting fluid is heated to a preset temperature.

Thus, the invention as such is related to a coating process for the coating of an interior of a pipework system with a coating material, preferably for the coating with an epoxy resin, which pipework system includes a part-system between a first connection and a second connection, wherein the coating process includes in a first process step the following steps in an arbitrary order: Providing a first pressure fluid, in particular air, which first pressure fluid is under a coating over-pressure with respect to an ambient pressure. Providing a second pressure fluid, in particular air, which second pressure fluid is under a coating low-pressure with respect to the ambient pressure. Providing the coating material in a storage tank, in particular in a storage hose. Connecting a pressure outlet of the storage tank with the first connection of the first part-system. Connecting a pressure inlet of the storage tank with the first pressure fluid being under the coating over-pressure. Connecting the second connection of the first part-system with the second pressure fluid being under the coating low-pressure. In a second process step the first part-system is pressurized by a differential pressure by applying via the first connection of the first part-system the first pressure fluid being under the coating over-pressure and, at the same time, by applying via the second connection of the first part-system the second pressure fluid being under the coating low-pressure in such a way that a fluid-flow of the coating material and the first pressure fluid is established through the part-system between the first connection of the first part-system and the second connection of the first part-system in a direction from the first connection to the second connection in such a way, that an inner surface of the part-system is being coated by the coating material. According to the invention, the second connection of the first part system is pressurized with the first pressure fluid being under the coating over-pressure after a leaving of the coating material out of the second connection of the first part-system at a checkpoint is detected.

In practice, the pipework system is frequently a networked pipework system including at least two networked sub-systems, preferably being networked by means of a networking-pipe, in particular by an uptake pipe or by a down pipe and the networked sub-systems preferably including at least one part-system.

The sub-system can include at least one second part-system being coupled to the first sub-system, wherein the part-system can be pressurized by a pressure difference via a first connection of the second part-system and via a second connection of the second part-system, and wherein the first connection of the second part-system is identical to the second connection of the first part-system.

Particularly preferably, the coating material is provided to the part-systems of a given sub-system by feeding it into the sub-system via that connection of the sub-system, which connection has the biggest distance to a networking-pipe being assigned to the sub-system.

After the entire pipework system is dedusted, in order to heat up the pipework system, the pipework system can be heated up during a preset bake-out period at a preset temperature, preferably at 37° for ca. 45 min. by using a bake-out medium, in particular by using hot air, and/or during a dedusting process and/or during a preparation process, the pipework system can be heated up to the preset temperature by a dedusting fluid, in particular by hot air, and/or the pipework system can be heated up to the preset temperature by a preparation fluid, in particular by hot air.

Regarding a special embodiment, the second connection of the second part-system is pressurized by the second pressure fluid being provided under the coating low-pressure until a leaving of the coating material out of the second connection of the second part-system is detected, and after that, the second connection of the second part-system is pressurized by the first pressure fluid being provided under the coating over-pressure.

After having coated all part-systems of a first sub-system, preferably all connections are pressurized by the first pressure fluid being provided under the coating over-pressure, and the networking-pipe being connected to the sub-system is coated at least as long as a leaving of the coating material out of the networking-pipe is detected at a checkpoint, wherein the networking-pipe is preferably pressurized by the second pressure fluid being provided under the coating low-pressure at a suction side.

In practice, the first sub-system is often connected to a further sub-system via the networking-pipe, in which further sub-system all connections of the further sub-system are pressurized by the second pressure fluid being provided under the coating low-pressure, and wherein the networking-pipe is coated until a leaving of the coating material out of a second connection of a part-system of the further sub-system is detected at checkpoint.

After that, the further sub-system can be coated in accordance with a process as above described.

Especially, a detection means can be provided for the detection of the leaving of the coating material, and the detection means is preferably a transparent hose and/or a detection sensor, in particular an optic, acoustic or an electromagnetic detection sensor.

It goes without saying that in practice the pipework system can include a plurality of sub-systems being preferably established in a plurality of floors of a building.

Thereby, a main-distributor can be provided for each sub-system, which main-distributor provides the first pressure fluid and/or the second pressure fluid to the assigned sub-system, and wherein the main-distributor is in particular a staircase-air-distributor.

Preferably, a sub-distributor is provided within each sub-system which sub-distributor provides the first pressure fluid and/or the second pressure fluid to the part-system of the sub-system, wherein the sub-distributor is in particular a distributor for a plumbing unit, and/or wherein the sub-distributor is designed in such a way that the first pressure fluid and/or the second pressure fluid can be alternatively and/or switchable provided at an outlet of the sub-distributor.

As a rule, but not compulsory, the first pressure fluid and/or the second pressure fluid is provided to the sub-distributor via the main-distributor.

The first working fluid being provided under the over-pressure is provided by a compressor or by an over-pressure reservoir, wherein the second working fluid being provided under the low-pressure is preferably provided by a vacuum machine or by a low-pressure reservoir.

For adjusting and/or controlling the over-pressure an air control station is provided and/or a water separator and/or a cyclone filter for separating a fluid is provided, in particular for separating water, an oil, an epoxy resin and/or for separating particles, in particular abrasive particles, especially for separating sand, and/or for separating an other environment-friendly or not environment-friendly material.

Among other things, the pipework system may be a pipework system of a building, in particular a cold water pipework system, a hot water pipework system, a circulation pipework system, a pipework system for a heating installation, in particular a floor heating installation, a gas pipework system, a wastewater pipework system, a water pipework system for a roof, a pipework system for a swimming-pool, a pipework system for pressurized air, a pipework system for distributing oil, and/or the pipework system may be a pipework system for an industrial facility, in particular a pipework system for wastewater, gas, oil, petroleum, crude oil, diesel oil, gasoline, chemical products, or for other industrial gases, industrial fluids or industrial solids, or the pipework system is a public pipework system for pipelining one of the aforementioned fluids, other fluids, or solids.

Advantageously, before starting the coating process, the entire pipework system is networked with at least all main-distributors, and/or with all sub-distributors and/or with all air control stations and/or with all water separators and/or with all cyclone filters.

In practice, frequently at least some of the sub-systems are provided on several floors being arranged one upon the other, in particular in a building, and the coating process is started in the topmost floor, wherein the sub-systems are subsequently coated from the topmost floor down to the lowermost floor.

An electronic data processing installation can especially be provided, wherein at least some of the main-distributors and/or of the sub-distributors and/or of the air control stations and/or of the water separators and/or of the cyclone filters are designed in such a way that the coating process can at least partly be carried out in a automatic and/or program controlled manner.

The invention is also related to a combined process, wherein in a first process step a preparation process in accordance with the invention is carried out, and/or a blasting process according to the invention and/or a dedusting process is carried out and/or wherein a coating process as described above is finally carried out.

Furthermore, the invention is related to a sub-distributor, in particular to an distributor for a plumbing unit for carrying out an above described process, with the sub-distributor comprising the following components: an over-pressure chamber having an over-pressure inlet for pressurizing the over-pressure chamber with a first working fluid provided under an over-pressure. A low-pressure chamber having a low-pressure inlet for pressurizing the low-pressure chamber with a second working fluid provided under a low-pressure. An over-pressure outlet for providing the first working fluid to a connection of a part-system in a sub-system. An low-pressure outlet for providing the second working fluid to a connection of the part-system in the sub-system.

According to the invention, a switching means is provided so that a pressure line being connected to the sub-distributor can be pressurized with the first working fluid and/or with the second working fluid.

The over-pressure outlet and the low-pressure outlet are preferably connected to each other with a common outlet adaptor.

Thereby, the over-pressure inlet and/or the low-pressure inlet and/or the over-pressure outlet and/or the low-pressure outlet can be separately closeable equipped with an closing-off means, respectively, in particular with an mechanical cut-off cock, especially with an automatic valve, preferably with an electrically operable valve.

For the determination of an operating parameter, a sensor means can be provided, for example for determining a temperature and/or a pressure, and or a switch setting of a closing-off means and/or for determining an other operating parameter of the sub-distributor and/or a sensor means can be provided at the sub-distributor for monitoring a first working fluid and/or a second working fluid.

In particular for automation, the sub-distributor can be designed and provided with electrical connections in such a way that a signal of the sensor means can be imported into a control system and/or the closing-off means are controllable by the control system, in particular being automatically and/or program-controlled closed-loop and/or open-loop controllable.

The invention relates furthermore to a working equipment for the treatment of a pipework system, the working equipment including a sub-distributor a described above for providing the first working fluid being provided under the over-pressure and the second working fluid provided under the low-pressure to a connection of a part-system in a sub-system.

Regarding the working equipment in accordance with the invention, the first working fluid being provided under the over-pressure is preferably provided by a compressor or by an over-pressure reservoir and/or the second working fluid provided under the low-pressure is provided by a vacuum machine or by a low-pressure reservoir.

Particularly advantageously, a main-distributor, in particular a staircase-air-distributor being fluidly connected to the sub-distributor is provided for supplying the first working fluid and/or for supplying the second working fluid to the sub-distributor, wherein for adjusting or controlling the over-pressure of the first working fluid, the main-distributor and/or the sub-distributor is supplied by an air control station in the operation state.

Especially due to antipollution reasons, a water separator and/or a cyclone filter can be provided for separating a fluid, in particular for separating water, oil, an epoxy resin and/or for separating particles, in particular abrasive particles, especially for separating sand, and/or for separating an other environment-friendly or not environment-friendly material, wherein the water separator and/or the cyclone filter can in particular be provided between the vacuum machine and/or the low-pressure reservoir and the main-distributor and/or the sub-distributor.

For automation, at the compressor and/or at the over-pressure reservoir and/or at the vacuum machine and/or at the low-pressure reservoir and/or at the air control station and/or at the water separator and/or at the cyclone filter and or at the main-distributor and/or at the sub-distributor and/or at the detection means for detecting the leaving of the coating material out of the connection of the part-system and/or at a pipe of the pipework system, a sensor for monitoring a operation parameter, in particular for monitoring a pressure or a temperature can be additionally provided.

Furthermore, at the compressor and/or at the over-pressure reservoir and/or at the vacuum machine and/or at the low-pressure reservoir and/or at the air control station and/or at the water separator and/or at the cyclone filter and/or at the main-distributor and/or at the sub-distributor and/or at the detection means for detecting the leaving of the coating material out of the connection of the part-system and/or at the pipe of the pipework system, an automatically, in particular an electrically operable valve can be provided, so that a fluid flow can be automatically generated or can be automatically cut off by the automatic valve.

Advantageously, a control system, particularly comprising an electronic data processing installation is additionally provided, so that, at least partly, the working equipment is completely automatically and/or program-controlled operable.

BRIEF DESCRIPTION OF THE DRAWINGS

In the following, the invention will be explained in more detail with reference to the schematic drawing. There are shown:

FIG. 3 incorrectly assumed installation of the pipes according to FIG. 2;

FIG. 4 error when coating by using a process known from the prior art;

DETAILED DESCRIPTION OF THE INVENTION

In order to better understand the invention, in the following an entire renovation process of a pipework system 1 is schematically explained with the help of a cold water installation 1 of a building, in which the installation extends over four floors, namely extending over the basement UG, the first floor EG, the first upper floor 1OG and the second upper floor 2OG.

It goes without saying that the invention in no means restricted to the renovation of cold water installations 1 of buildings extending over three floors, but is also related to the renovation of all kinds of pipework systems 1, for to a hot water pipework system 1, a circulation pipework system 1, a pipework system for a heating installation 1, in particular a floor heating installation 1, a gas pipework system 1, a wastewater pipework system 1, a water pipework system 1 for a roof, a pipework system 1 for a swimming-pool, a pipework system 1 for pressurized air, a pipework system 1 for distributing oil, wherein the pipework system 1 can be a pipework system 1 for buildings having any number of floors, or for example it is a pipework system 1 for an industrial facility, in particular a pipework system 1 for wastewater, gas, oil, petroleum, crude oil, diesel oil, gasoline, chemical products, or for other industrial gases, industrial fluids or industrial solids, and/or wherein the pipework system 1 is a public pipework system 1 for pipelining one of the aforementioned fluids, other fluids, or solids or it is any other pipework system 1 to be renovated.

Figure 1:
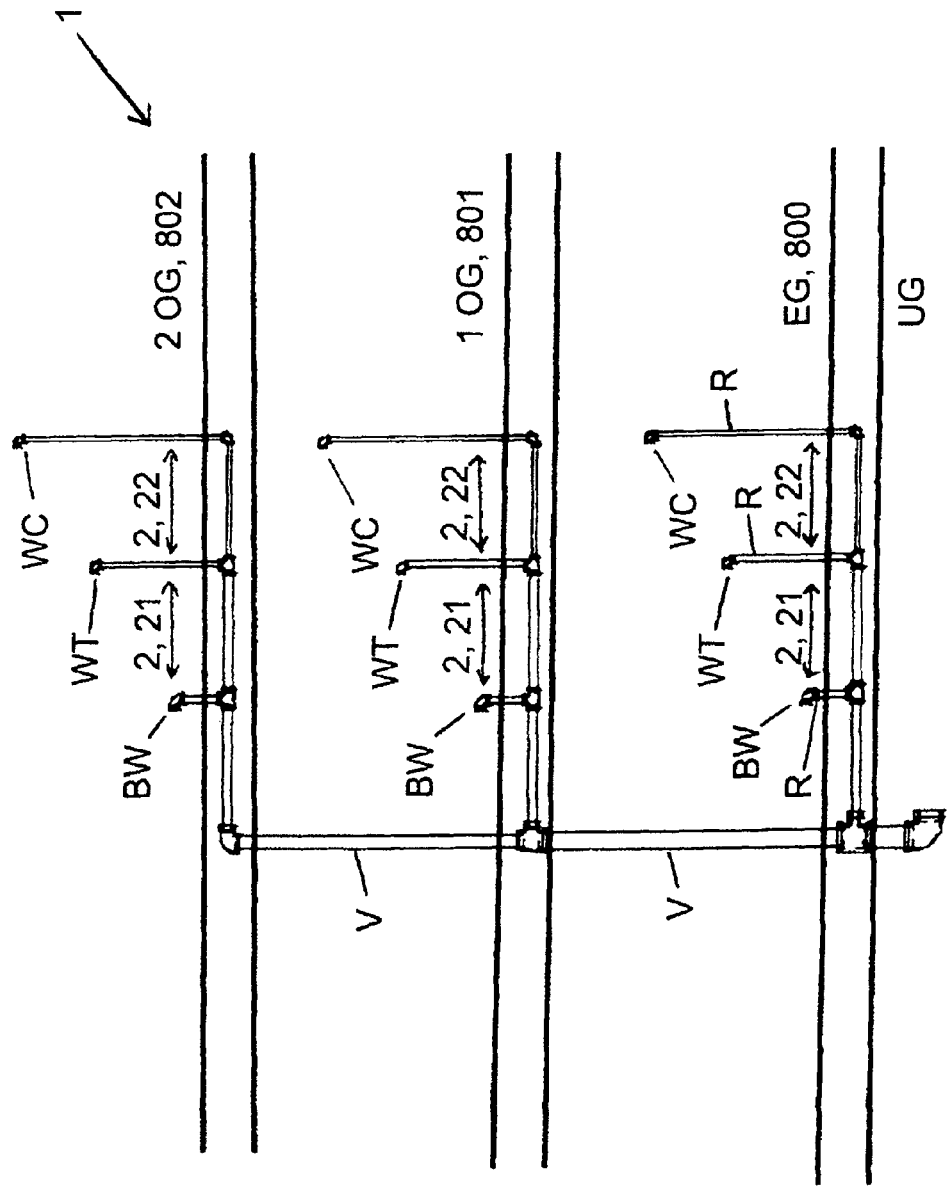
FIG. 1 an overview of a basic cold water installation.

The cold water installation 1 according to FIG. 1 extends over four floors of a building, namely over the basement UG, the first floor EG, the first upper floor 1OG and the second upper floor 2OG.

Thus, the cold water installation 1 includes three sub-systems 8, 800, 801, 802, wherein the sub-system 800 is provided in the first floor EG, the sub-system 801 in first upper floor 1OG and the sub-system 802 in the second upper floor 2OG.

In order to simplify the discussion, a relatively simple pipework system 1 is chosen with all sub-systems 8, 800, 801, 802 being essentially identical and with only one bathroom being concerned on each floor, wherein one connection for a bathtub BW, a washbasin WT, and a water-closet WC is provided.

It is understood that in reality a plurality of further connections can be provided within a sub-system 8, 800, 801, 802, as a rule, there will be for example in addition a complete kitchen installation with a rinsing tank, dish washer, and so on. It is naturally also possible that there are multiple sub-systems on one floor for example belonging to different apartments, or it is of course also possible that there is only one kitchen installation on one floor wherein a bathroom installation is on another floor. Regarding this, the sub-systems 8, 800, 801 802 that can be treated with the process in accordance with the invention, have of course not to be identical but a part of them or all of them can be different, too.

As in principle known, the sub-systems 8, 800, 801, 802 are networked to each other by means of a networking-pipe V, wherein in case of the cold water installation 1 according to FIG. 1 the networking-pipe V is a uptake pipe V via which the cold water is supplied to the respective sub-systems 8, 800, 801, 802 so that the cold water is available at the respective water plugs of the bathtub BW, the washbasin WT, and the water-closet WC.

By the way, for clarity reasons the related wastewater installation is not displayed in FIG. 1 and it is understood that it could also be renovated with the working process in accordance with the invention in case of need.

The sub-systems 8, 800, 801, 802 according to FIG. 1 each includes a first part-system 2, 21 which is in the present example defined by the pipes between bathtub BW and the washbasin WT and a second part-system 2, 22 which is defined in the present example by the pipes between the washbasin WT and the water-closet WC. Regarding sub-systems 8 in which additional connections are provided yet, there are additional part-systems 2 defined, too.

Figure 2:
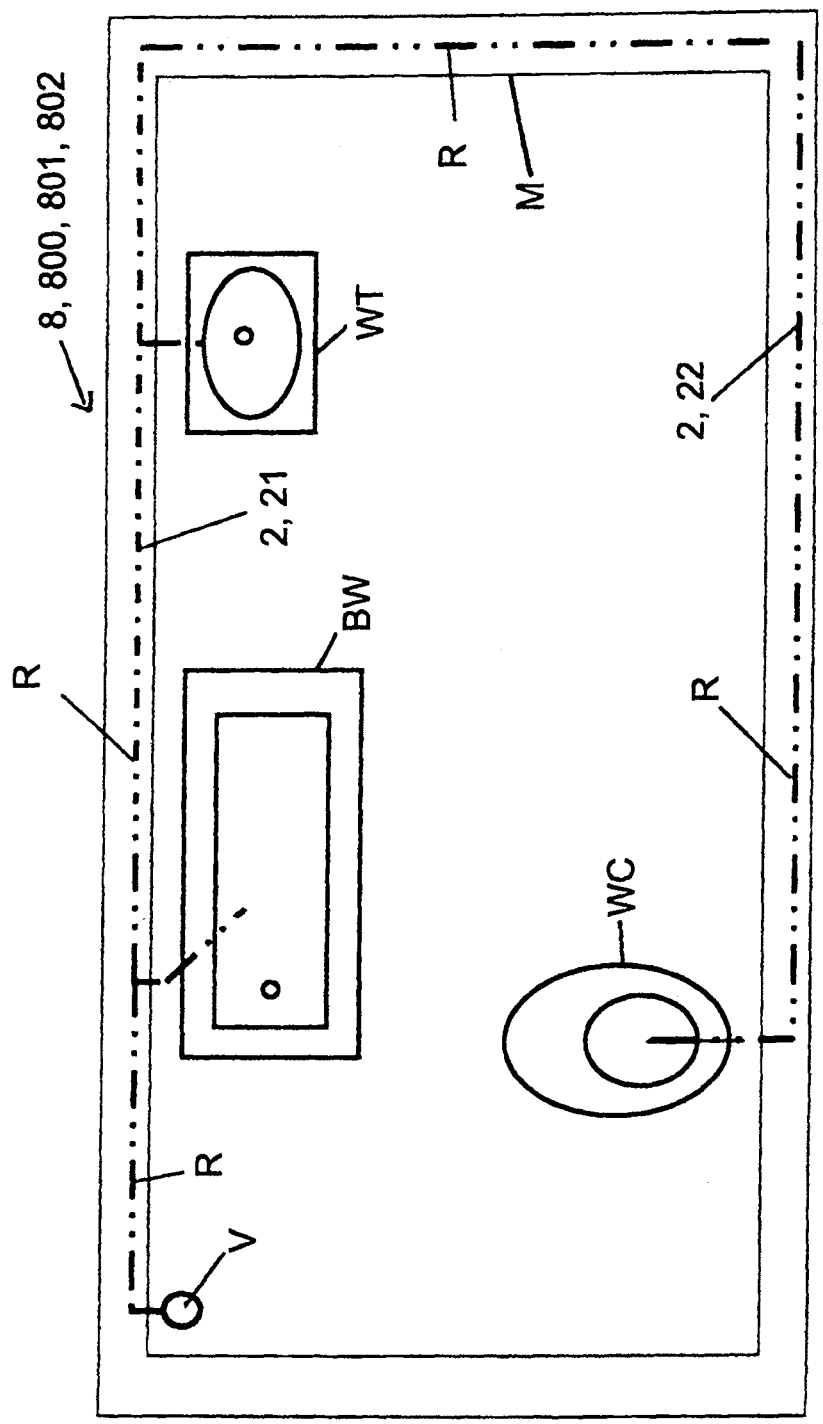
FIG. 2 correct installation of the pipes of the cold water installation according to FIG. 1 within the stonework of a building.

In FIG. 2, the correct installation of the pipes R of the part-systems 2, 21, 22 of the cold water installation according to FIG. 1 within the stonework M of the building is displayed. For simplicity reasons it is assumed that this kind of installation of the pipes R is identical in all three floors EG, 1OG, 2OG but, of course, that must not be the case in practice and is essentially for the application of the present invention not of importance.

It can be clearly seen that both the bathtub BW as well as the washbasin WT are connected through the stone work M via the pipes R to the uptake pipe V across the shortest path possible, wherein the water-closet WC is not connected to the uptake pipe V via the shortest path possible but is connected to the uptake pipe past the considerable longer path past the bathtub BW and the washbasin WT.

In practice, it is unfortunately very often the case that no building plans or only very imprecise building plans are available showing the real path of the pipes R within the stonework M. Thus, there are very often misunderstandings leading for example to an incorrect assumption of the installation of the pipes R within the stonework M.

A respective situation is schematically displayed by FIG. 3 partly showing the correct installation of the pipes R within the stonework M in case of the bathtub BW and the washbasin WT but erroneously assuming an incorrect installation of the pipes R between the water-closet WC and the uptake pipe V. The erroneously assumed path F between the water-closet WT and the uptake pipe V is displayed in FIG. 3 by the dotted line F.

In case that an anterior process known from the prior art is used to renovate the sub-system 8 of the pipework system 1 according to FIG. 2 or FIG. 3, respectively, fatal failures will inevitably occur when draining, sand blasting, drying, and dedusting, and above all when coating the pipework system 1.

The reason for that is that all known processes are based on that the length of the pipe section to be treated, that is the length of the pipe R of the part-system 2, 21, 22 to be treated must be known to some extent. The fatal consequences resulting from the fact that the length of the pipes R to be treated is wrongly assessed can be most easiest seen regarding the process step of coating what shall be shortly explained with the help of FIG. 4.

In FIG. 4 the sub-system 8, 800, 801, 802 according to FIG. 2 or FIG. 3, respectively, is displayed after being coated having used a process known from the prior art. Thereby, before coating to wrong assumptions had been made accidentally because the building plans in which the sub-systems had been charted are inaccurate. On the one hand it was assumed that the water-closet WC would be connected to the uptake pipe V via the shortest path possible according to the dotted line F. On the other hand, the distance between the washbasin WT and the bathtub BW had been specified too short. That is, both the length of the pipe R from the water-closet WC to the next connection, namely to the washbasin WT as well as the length of the pipe R between the washbasin WT and the bathtub WT are actually longer than assumed.

The coating process known from the state of the art runs as follows: at first the length of the pipe to be coated is assessed as accurate as possible, for example by the help of a building plan, and using that and additionally taking into account the interior geometry of the pipe, the necessary amount of coating material 541 is estimated. The so calculated amount of coating material 541 can is provided within a storage tank 5400 which can be for example a piece of hose 5400. Regarding the present example displayed with the help of FIG. 4, the connections of the water-closet WC, of the washbasin WT and of the bathtub BW are connected this way to the storage tank 5400 at the same time. Via the valves VT' all storage tanks 5400 are charged with the pressurized air D' at the same time for a preset period of time. As a result, the coating material 541 is pressed out of the storage tanks 5400 into the pipes R and the interior walls of the pipes R are coated inside over the length as before calculated. The so coated pipe sections R are labeled in FIG. 4 by the continuous lines. The pipe sections R displayed as dotted lines being located within the encircled areas indicated with a question mark ?, in contrast, are not coated since because of the faulty building plans or because of faulty assumptions the length of the pipe sections R have been calculated incorrectly. What is much worse: it is not at all possible to discover that some sections of the pipes are not coated since the interior of the pipe is at least over the major part of its length not accessible.

As a result, by using a process known from the prior art, a part of the pipes is not coated what cannot be discovered and leading to that pipes in the respective sections keep corroding, will be rusted through sometime so that the entire renovation was completely useless.

By using the process in accordance with the invention such fatal failures are perfectly excluded as will be explained in the following with the help of the description of the process flows.

With the help of FIG. 5a to FIG. 5i, at first a special embodiment of a draining process for the draining of a pipework system 1 shall be schematically explained.

Figure 5A:
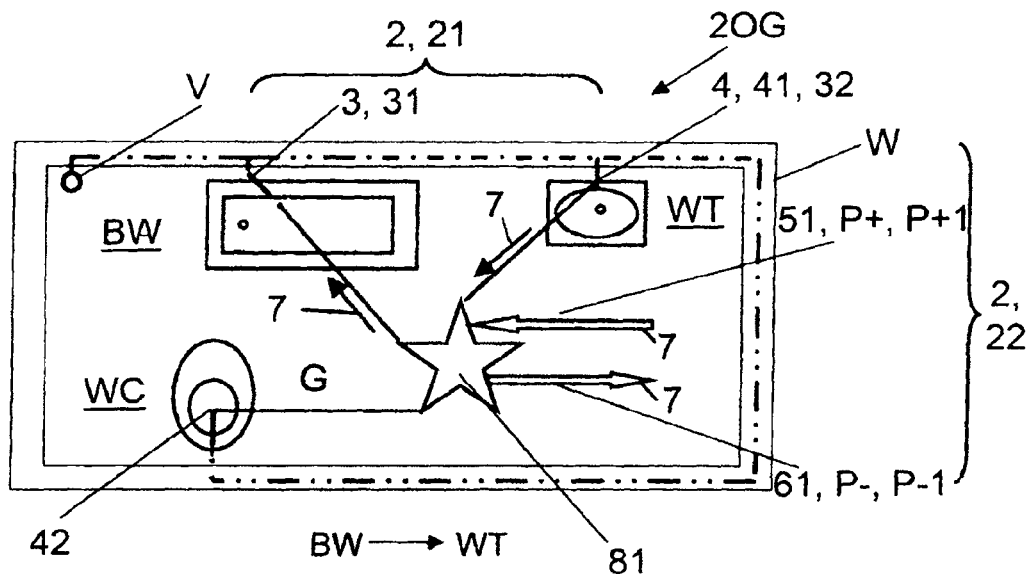
FIG. 5*a*-5*i* a new draining process.

According to FIG. 5a, at first all sub-distributors 81, which are in the present example distributors for a plumbing unit, are supplied with a preparation fluid 51 being provided under the preparation over-pressure $P_+$, $P_{1+}$ by one or more main-distributors 80, that are not displayed here, which preparation fluid is in the present example simply pressurized air 51.

The air distributor 81 for a plumbing unit in accordance with FIGS. 5a to 5i can thus be connected to five different connections 3, 4 at the same time, wherein only three connections are used in the present example. It is understood that also other distributors 81 for a plumbing unit that can be connected to less or more connections 3, 4 can advantageously be used.

Regarding a multi floor building the desiccation starts preferably in the topmost floor and is then carried out successively down to the lowermost floor.

Regarding the example of FIG. 5a to FIG. 5i, the preparation process for draining and desiccation of the pipework system 1 starts in the 2OG of the building that is the topmost floor of the building.

In a first step according to FIG. 5a, at first the first connection 31 of the bathtub BW is pressurized with the first preparation fluid 51 provided under the preparation over-pressure $P_{+1}$ and the second connection 41 is pressurized with the second preparation fluid 61 provided under the preparation low-pressure $P_{-1}$, which second preparation fluid is preferably simply air being supplied under the low-pressure that is for example generated by a vacuum machine that is not displayed here. In contrast, the connection 42 of the water-closet WC is closed off as indicated by the letter G.

Please note that in the framework of this specification a connection being indicated by a G is a connection that is closed off. That is, it is for example closed off by means of a cut-off cock in such a way that it is neither pressurized by a first working fluid 5, 51, 52, 53, 54 nor by a second working fluid 6, 61, 62, 63, 64.

In a first step, thus the first part system 2, 21 is in accordance with FIG. 5a at least partly drained from an agent, for example from a agent which is water that is circulating through the pipework system in the operation state. An agent drained in such a way, is extracted by suction via the distributor 81 for a plumbing unit and the staircase-air-distributor 80 and is for example separated in a separator and is disposed in an appropriate way. In this connection, the arrows indicate the direction of the fluid-flow 7 within the pipework system 1.

Figure 5B:
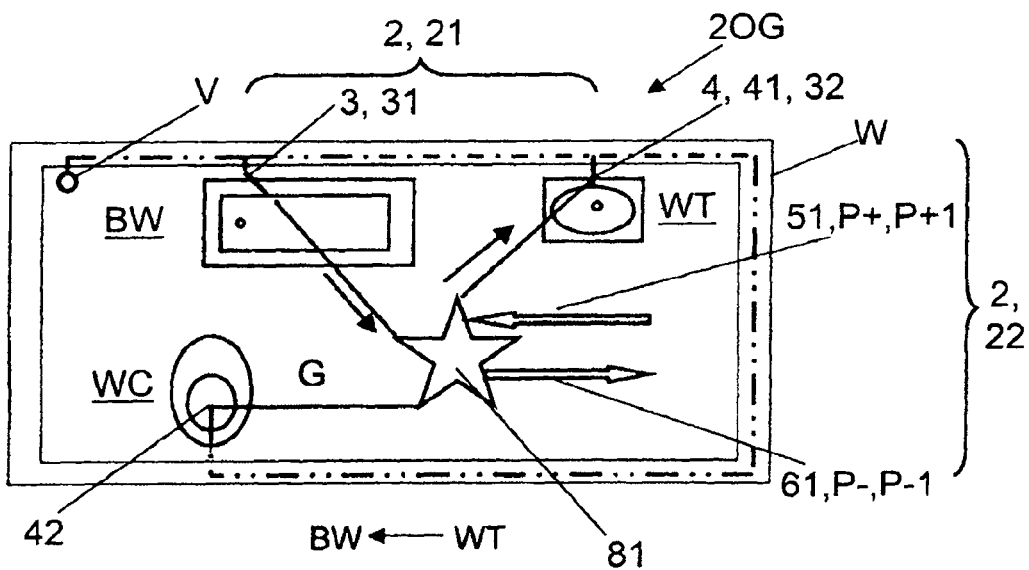

After that, according to FIG. 5b the direction of the fluid flow of the preparation fluid 51, 61 is reversed within the first part-system 21 by pressurizing the second connection 41 of the first part-system 21 with the first preparation fluid 51 being provided under the preparation over-pressure $P_{+1}$, wherein at the same time the first connection 31 of the first part-system is pressurized with the second preparation fluid 61 being provided under the preparation low-pressure $P_{-1}$.

Since the part-systems 2, 21, 22 are passed through with the preparation fluid 51, 61 contrariwise in two different directions, respectively, the pipework system can be drained or dried, respectively, particularly effective. In particular procedural matters as for example water which has accumulated at the bendings of the pipework system 1 when draining it and, thus, cannot be removed if the pipework system 1 is drained only in one direction, can be drained out by scavenging the pipework system 1 with the preparation fluid 51, 61 in two opposite directions.

That is one of the crucial advantages of the new draining process, which is characterized in that the direction of the fluid flow in a part-system 2, 21, 22 is at least one times reversed.

Figure 5C:
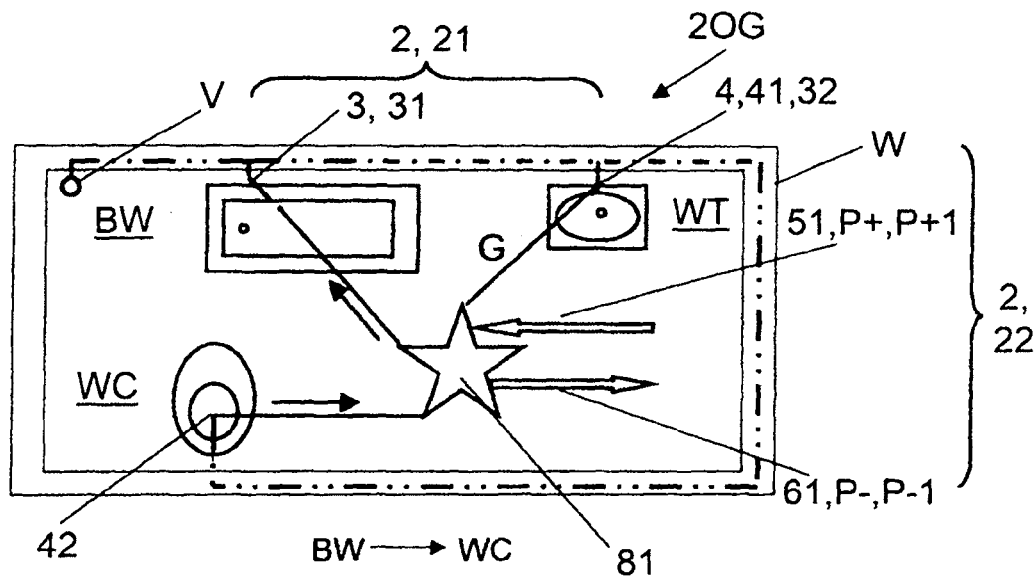
Figure 5D:
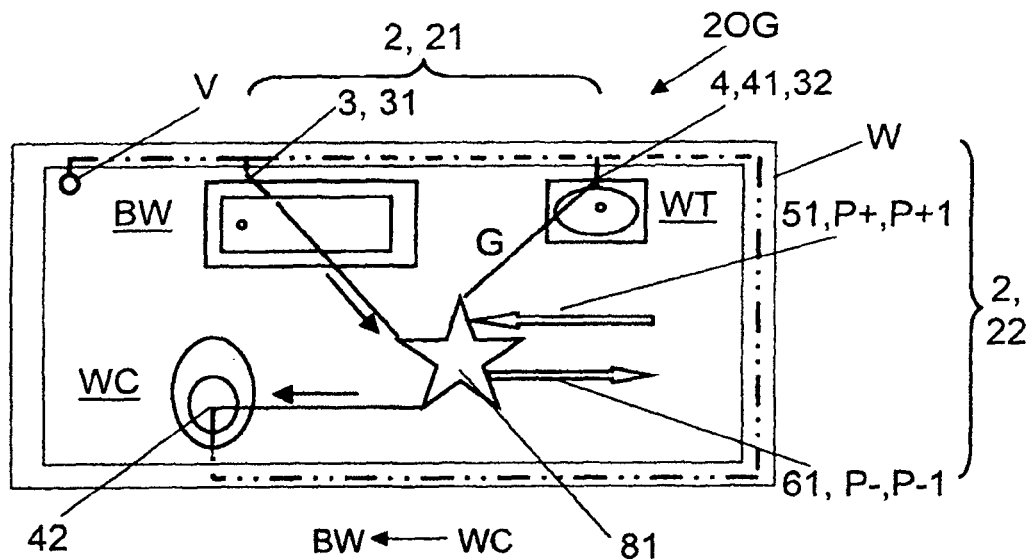

With the help of FIG. 5c and FIG. 5d the next process step is displayed, in which next process step now perfectly analog the pipework section between the first connection 31 of the bathtub BW and the second connection of the water-closet WC is drained, wherein the connection 41, 32 is closed off as indicated by G.

Figure 5E:
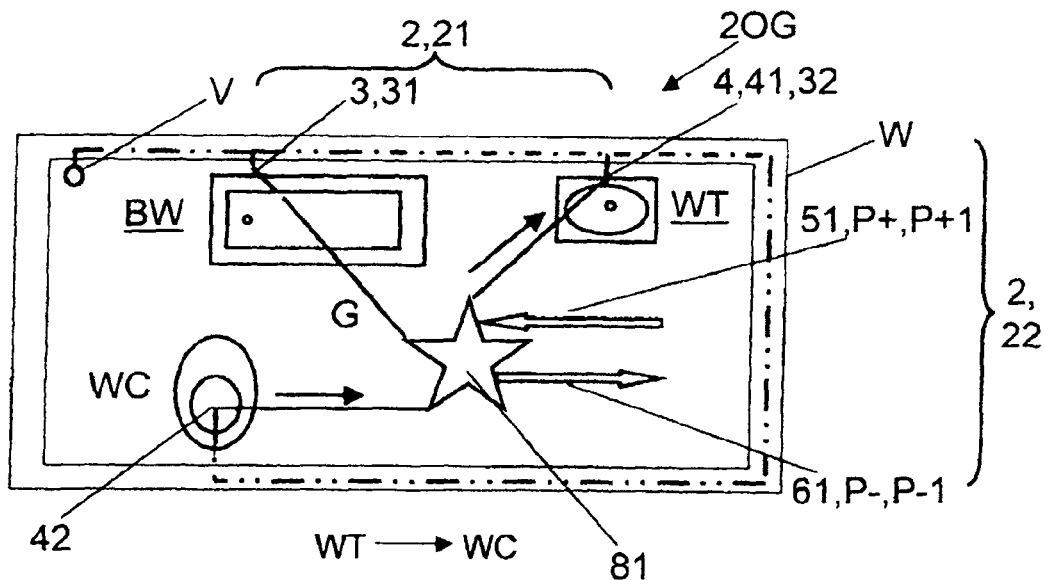
Figure 5F:
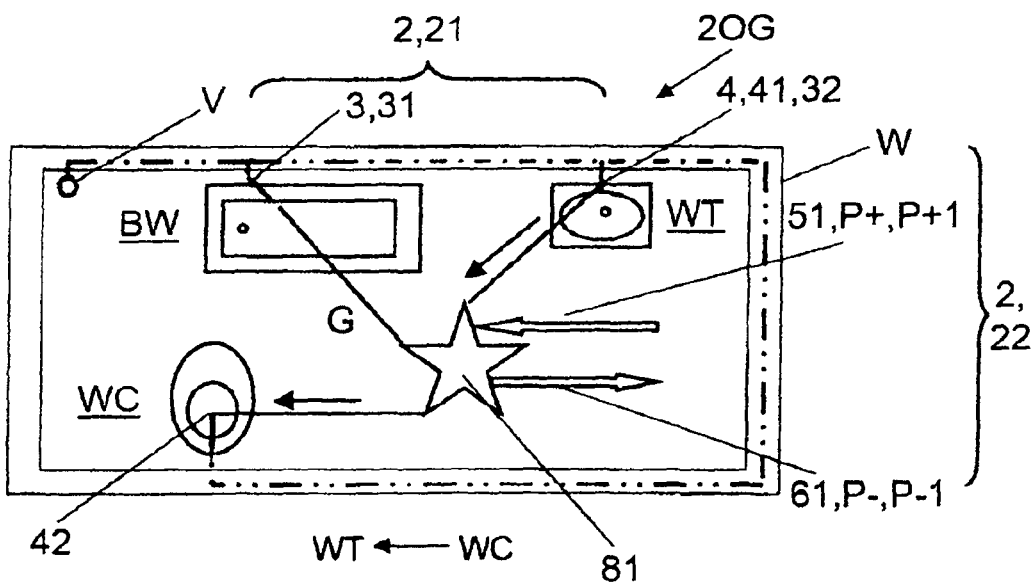
Figure 5G:
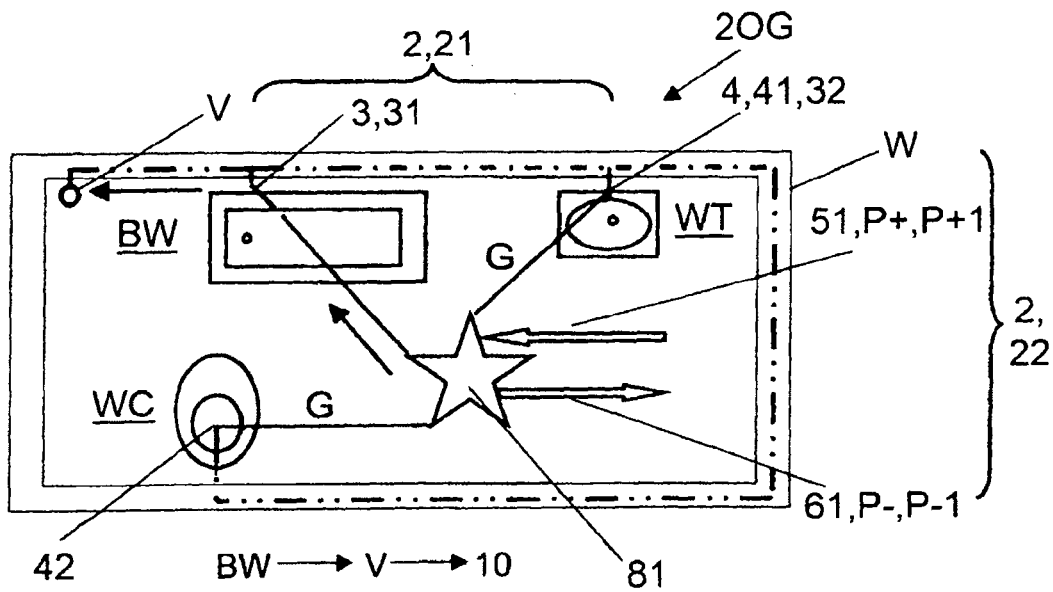

Next, according to FIGS. 5e and 5f the pipework section between the connection 41 of the washbasin WT and the connection 42 of the water-closet WC is subsequently drained in two opposite directions by closing off at the same time the connection 31 of the bathtub BW.

So far, the pipework connection between the connection 31 of the bathtub BW and the uptake pipe V has not been drained yet. Hence, in accordance with FIG. 5d, at first the connection 41 at the washbasin WT and the connection 42 of the water-closet WC are close off and only the connection 31 at the bathtub BW is pressurized by the first preparation fluid 51 being provided under the preparation over-pressure $P_{+1}$.

Figure 5H:
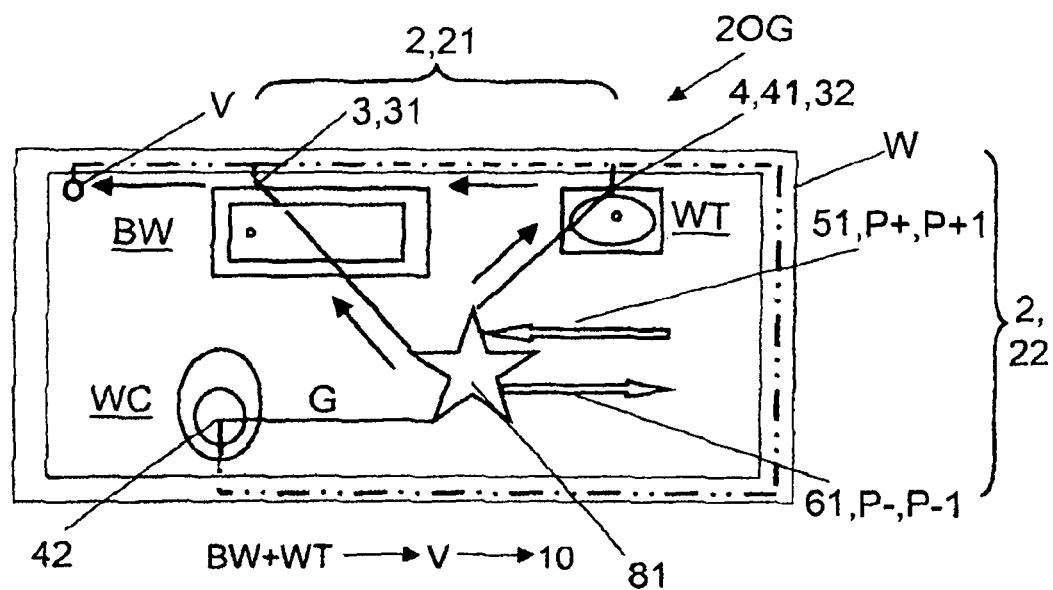
Figure 5I:
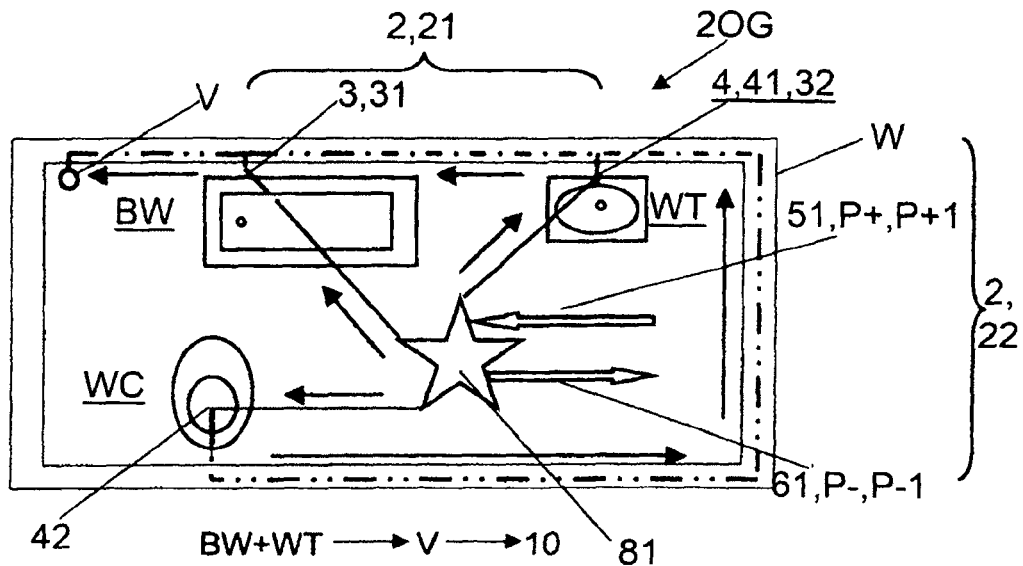

Regarding a last but one step, according to FIG. 5h the connection of the washbasin WT is additionally also pressurized by the preparation fluid 51 while the connection 42 of the water-closed WC is still remaining closed off, and at last, as displayed with the help of FIG. 5i, all connections 3, 31, 32, 4, 41, 42 of the part-systems 2, 21, 22 of the second upper floor 2OG are pressurized by the first preparation fluid 51 being provided under the preparation over-pressure $P_{+1}$, so that a very effective and perfect draining of the pipework system 1 is assured in the region of the second upper floor 2OG including the uptake pipe, at least down to the first upper floor 1OG.

Perfectly analog, it is then continued with the draining of the pipework system 1 of the subjacent floors through the pipework system 1 is drained in all floors.

Finally, the entire pipework system 1 is held under pressure for a preset period of time, for example for five minutes, and after that the entire drained pipework system 1 is preferably perfectly dried up by means of hot air. Depending on the situation, the drying-out by means of hot air can take for example ca. 45 min. at a temperature above 37° C. After that, the entire pipework system is depressurized and the pipework system 1 is ready for cleaning, for example by means of sand blasting.

Now, the sand blasting process in accordance with a special embodiment of a new sand blasting process will be schematically explained with the help of FIG. 6a to FIG. 6j. The blasting of the interior of the pipework system 1 acts as the cleaning of the inner pipe walls and the removal from corrosion, for example from rust, the removal of depositions such as for example limescale or the removal or cleaning from other contamination and depositions within the interior of the pipework system 1.

Figure 6A:
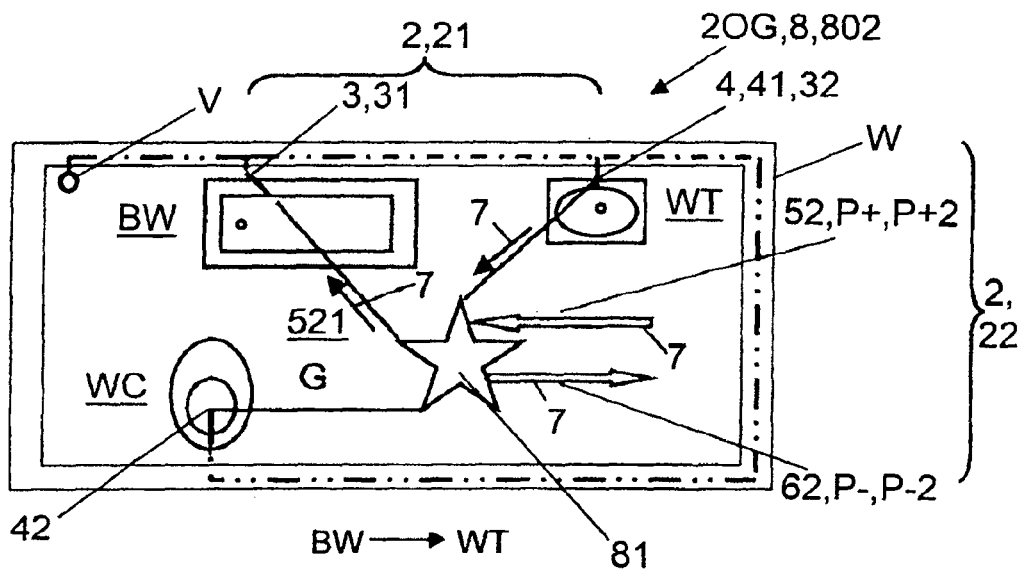
FIG. 6a-6j a new sand blasting process.

Regarding the first step according to FIG. 6a, the first part-system 2, 21 is at least partly freed from contaminations or depositions, for example from rust or from limescales. Contaminations removed in such a way are then sucked out via the distributor 81 for the plumbing unit and via the staircase-air-distributor 80, and for example deposited in a separator or a cyclone filter and appropriately disposed.

Thereby, the arrows in all figures indicate the direction of the fluid-flow 7 within the pipework system 1.

Figure 6B:
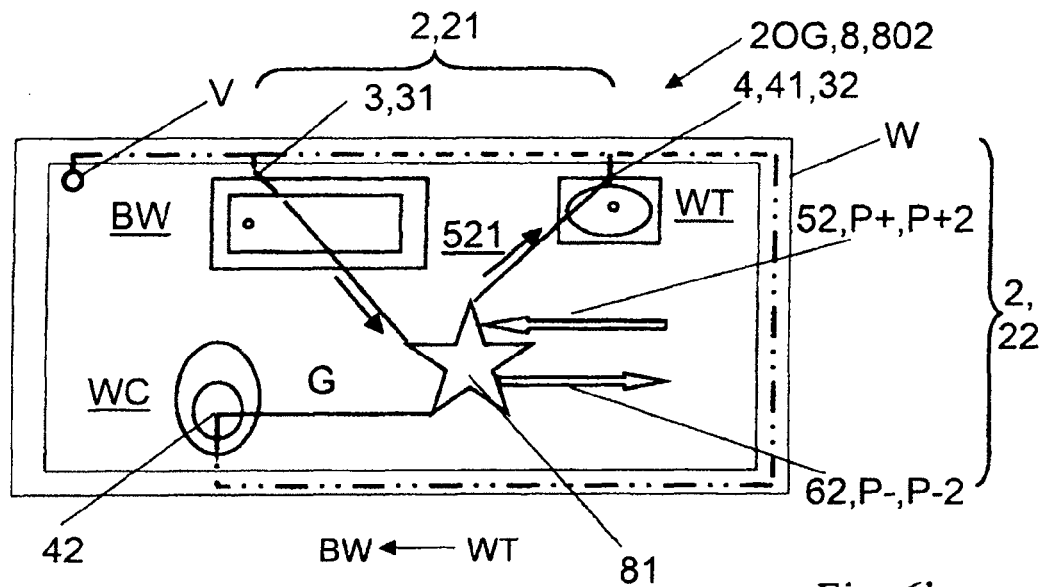

After that, in accordance with FIG. 6b the direction of the flow of the blasting fluid 52 that is preferably air being charged with a blasting means 521, preferably being charged with sand 521, is reversed in the first part-system 21 by pressurizing the second connection 41 of the first part-system 21 with the blasting fluid 52 being provided under the blasting over-pressure $P_{+2}$, wherein at the same time the first connection 31 of the first part-system is pressurized with the second blasting fluid 62 being provided under the blasting low-pressure $P_{-2}$, which second blasting fluid 62 is preferably air under low-pressure.

Since according to the new blasting the part-systems 2, 21, 22, respectively, are blasted by the blasting means 521 in two opposite directions, the pipework system can be cleaned in a particular effective manner. In particular contaminations or deposition that accumulate for example while blasting at a bending of the pipework system 1 and, as a result, cannot be removed in case that the pipework system 1 is blasted in one direction, only, can be discharged out of the pipework system 1 in the opposite direction by blasting with the blasting means 521 in the opposite direction.

What is more, the new blasting process treats the pipework system 1 much more gently than the processes known from the prior art. Since the pipe sections are successively blasted in two different directions, the abrasive blasting treatment, that of course always also affects the wall material of the pipework to a certain degree, is less aggressive because the abrasive stress acts in both direction onto the walls of the pipes and not one-way only in one direction. Furthermore, by using the two-way blasting method, the intensity of the blasting, that means for example the pressure by which the blasting means 521 is pressed through the pipes, can be chosen significantly lower for each single blasting direction. That is particularly important for the bendings of the pipework system 1 by using the very aggressive sand blasting processes as known from the state of the art. By using the known processes, in particular the bendings of the pipework, at which bendings the blasting fluid strikes the interior wall of the pipes more or less perpendicularly, are very often seriously damaged, in worst cases by a perforation, that is leading to holes in the pipe wall, what of course mostly can be only repaired be replacing the affected pipe sections, what just should be avoided by applying the renovation method.

Figure 6C:
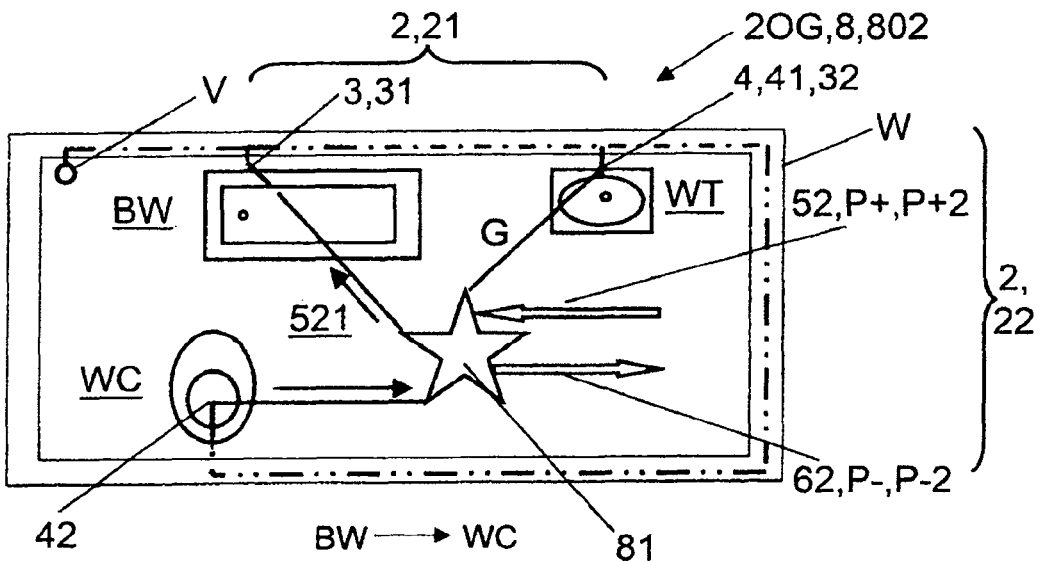
Figure 6D:
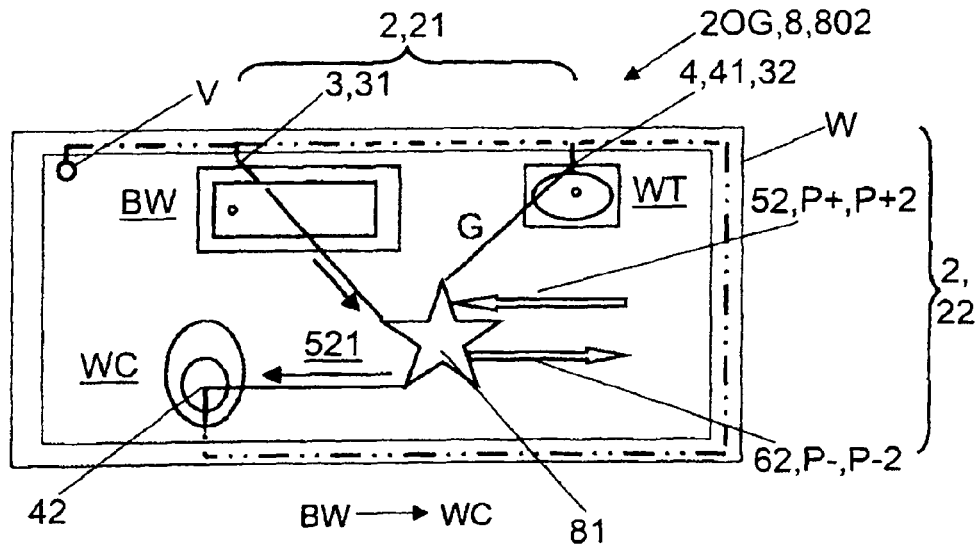

By means of FIG. 6c and FIG. 6d the next process step is displayed, wherein now perfectly analog the pipework section between the first connection 31 of the bathtub BW and the second connection 42 of the water-closet WC is sand blasted, while the connection 41, 32 is closed off as indicated by G.

Figure 6E:
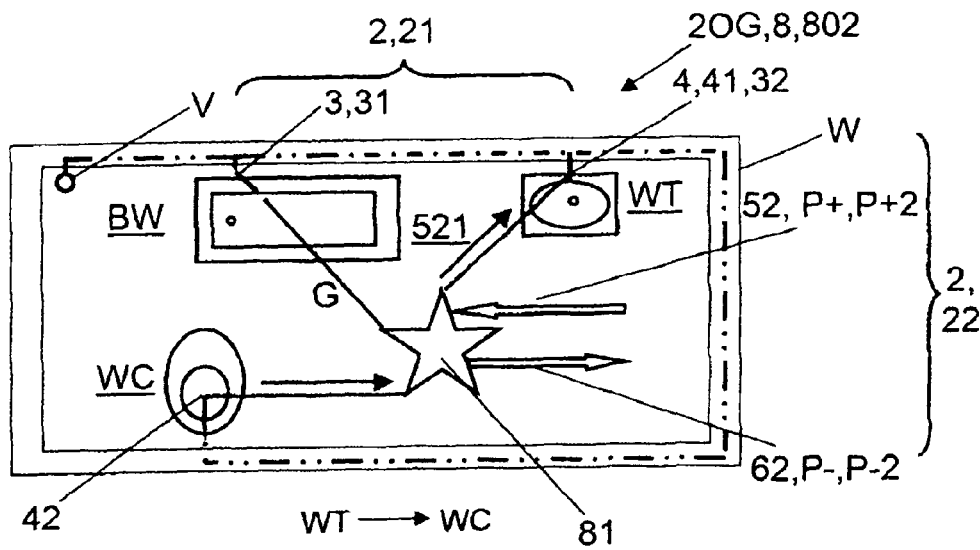
Figure 6F:
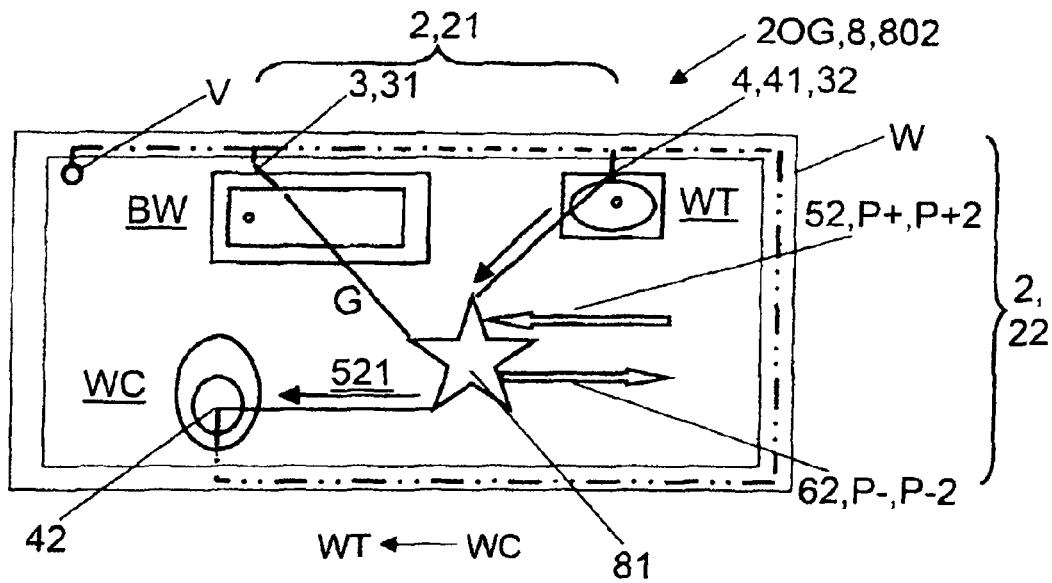
Figure 6G:
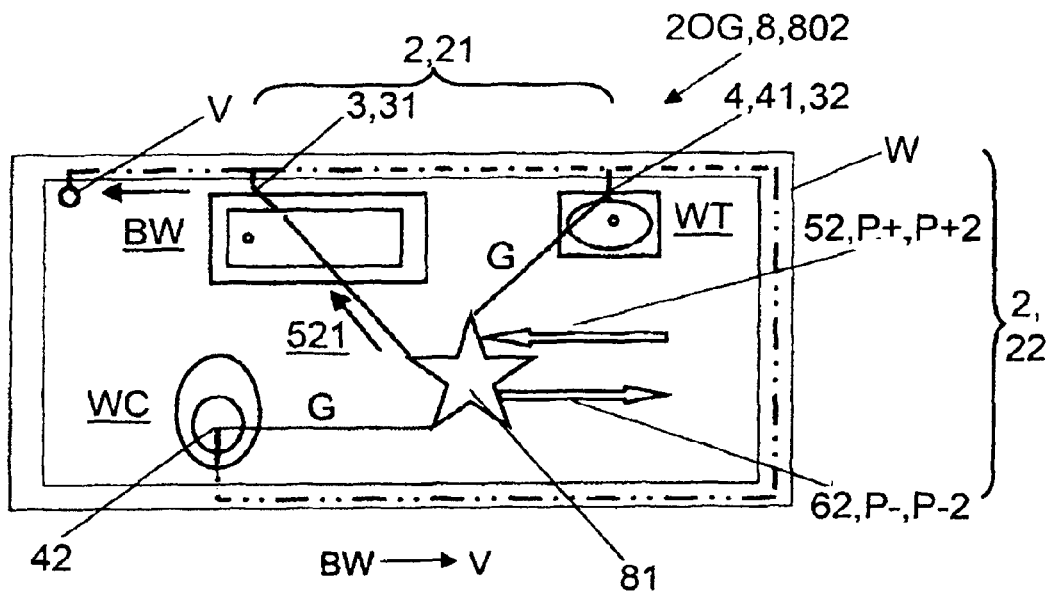

According to FIGS. 6e and 6f the section of the pipework system between the connection 41 of the washbasin WT and the connection 42 of the water-closet 42 are subsequently drained in two opposite directions in the next step by closing off at the same time the connection 31 of the bathtub BW.

The pipework section between the connection 31 of the bathtub BW and the uptake pipe V has not been blasted yet at this stage. Thus, according to FIG. 6g the connection 41 at the washbasin WT and the connection 42 of the water-closet WC are closed off and only the connection 31 at the bathtub BW is pressurized by the first blasting fluid 52 being provided under the blasting over-pressure $P_{+2}$.

Figure 6H:
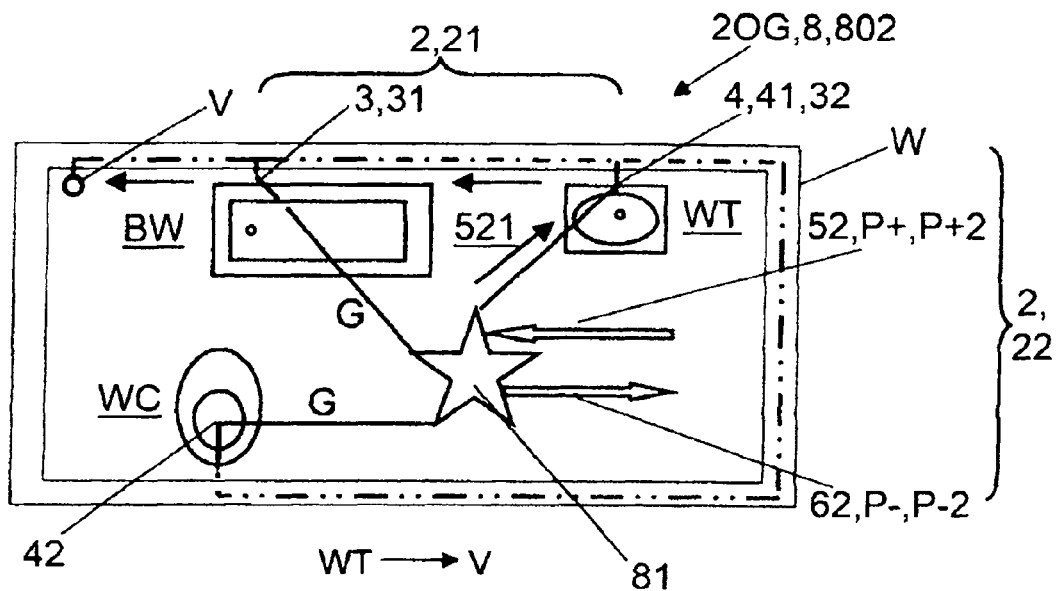
Figure 6I:
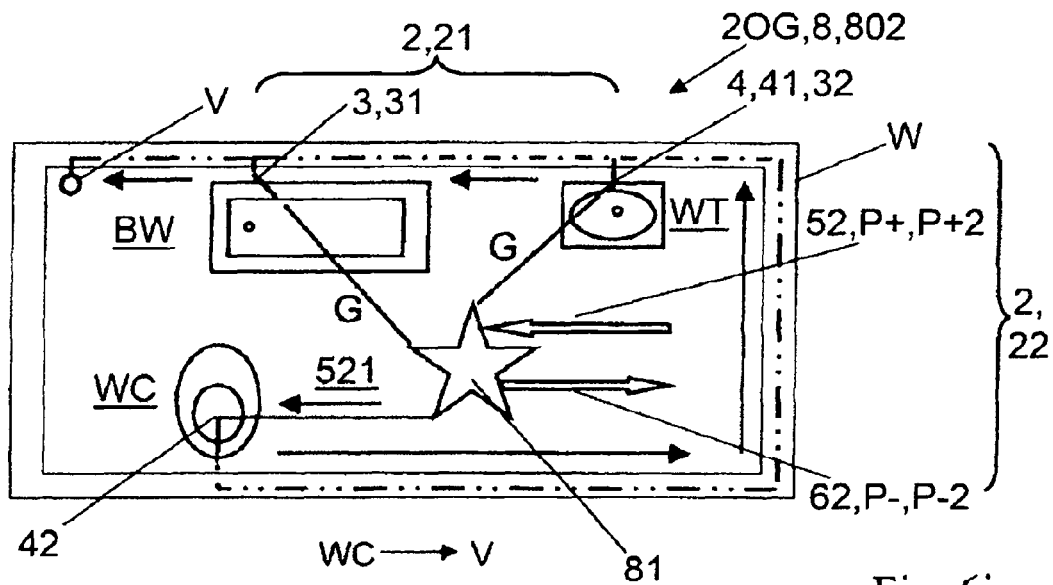

Regarding a next step in accordance with FIG. 6h, the connections 42 and 31 are closed off and only the path from the washbasin WT to the uptake pipe V is blasted, and according to FIG. 6i, in a final step blasting takes only place via the path from the water-closet WC to the uptake pipe V, while the connections 41 and 31 are closed off at the same time.

Figure 6J:
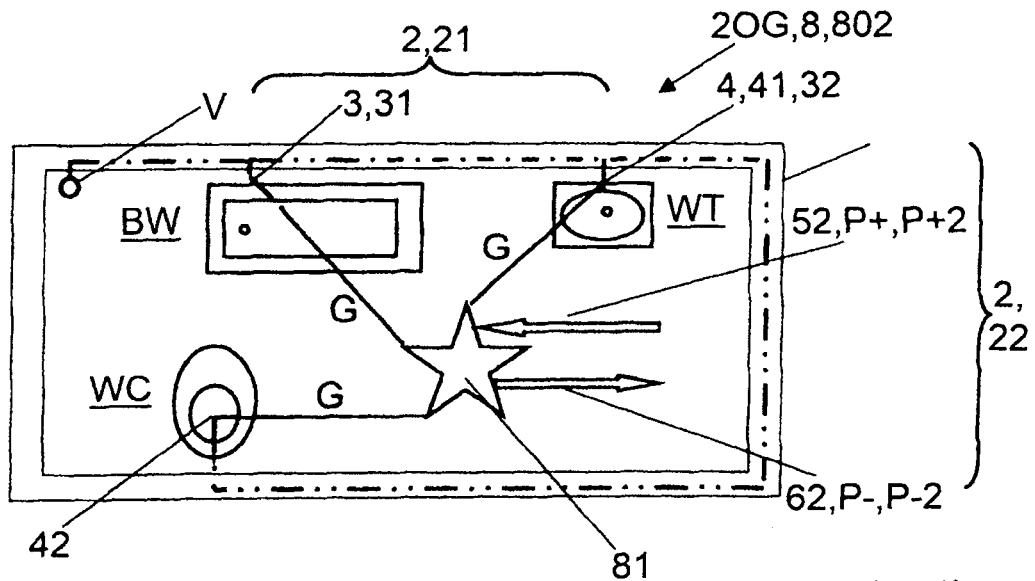

Therewith, the sand blasting process is finished in the second upper floor 2OG and, as indicated by FIG. 6j, all connections 3, 31, 32, 4, 41, 42 of the part-systems 2, 21, 22 are close off and the sand blasting process is perfectly analog continued in the first upper floor 1OG until the entire pipework system 1 is cleaned from contaminations and depositions at the end.

Before the coating of the pipework system 1 can be started, the pipework sytem 1 must be dedusted, that is it all solid residue such as dust-like depositions, residue from the blasting means and so on must be removed, which residue are either loosely deposited within the pipes or are adhered or deposited at the interior wall of the pipe, in particular at the bendings of the pipework system 1.

To this, as displayed by FIG. 7a to FIG. 7i a new dedusting process is carried out, which dedusting process is very similar to the above described draining process.

Figure 7A:
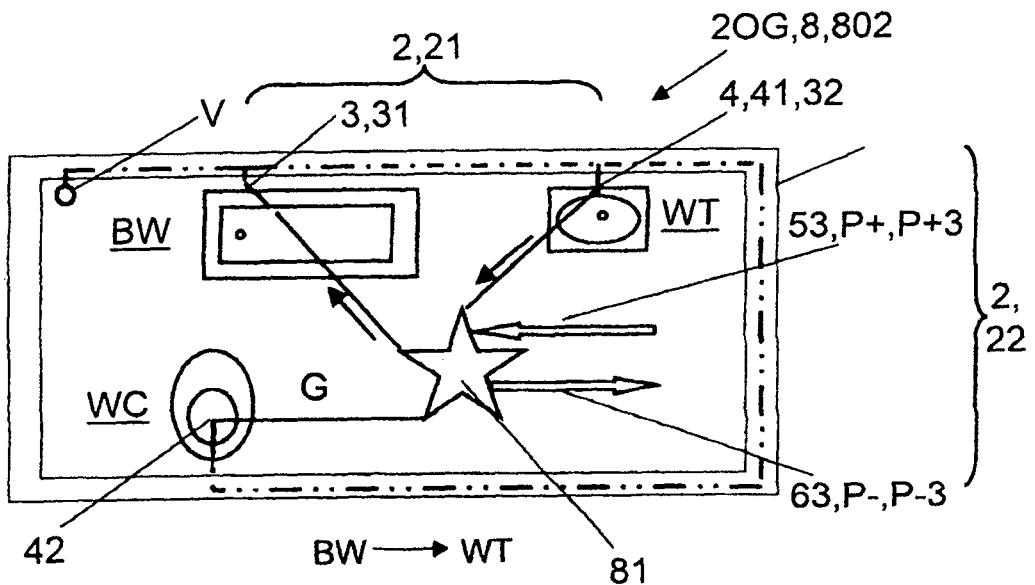
FIG. 7a-7i a new dedusting process.

In a first step according to FIG. 7a, initially the first connection 31 of the bathtub BW is pressurized by the first dedusting fluid 53, preferably by air 53 being provided under the dedusting over-pressure $P_{+3}$ and the second connection 41 is pressurized by the second dedusting fluid 63 being provided under the dedusting low-pressure $P_{-3}$, which second dedusting fluid 63 is preferably simply air 63 being provided under a low-pressure, for example being generated by a vacuum machine that is not displayed here.

Against that, the connection 42 of the water-closet WC is closed off as indicated by the character G.

Regarding a first step in accordance with FIG. 7a, the first part-system 2, 21 is thus at least partly freed from a dust that remained from blasting in the pipework system 1. Dust being removed in such a way is sucked out via the distributor 81 for the plumbing unit and via the staircase-air-distributor 80, and for example deposited in a separator or a cyclone filter and appropriately disposed.

As before, the arrows thereby indicate in all Figures the direction of the fluid-flow 7 within the pipework system 1.

Figure 7B:
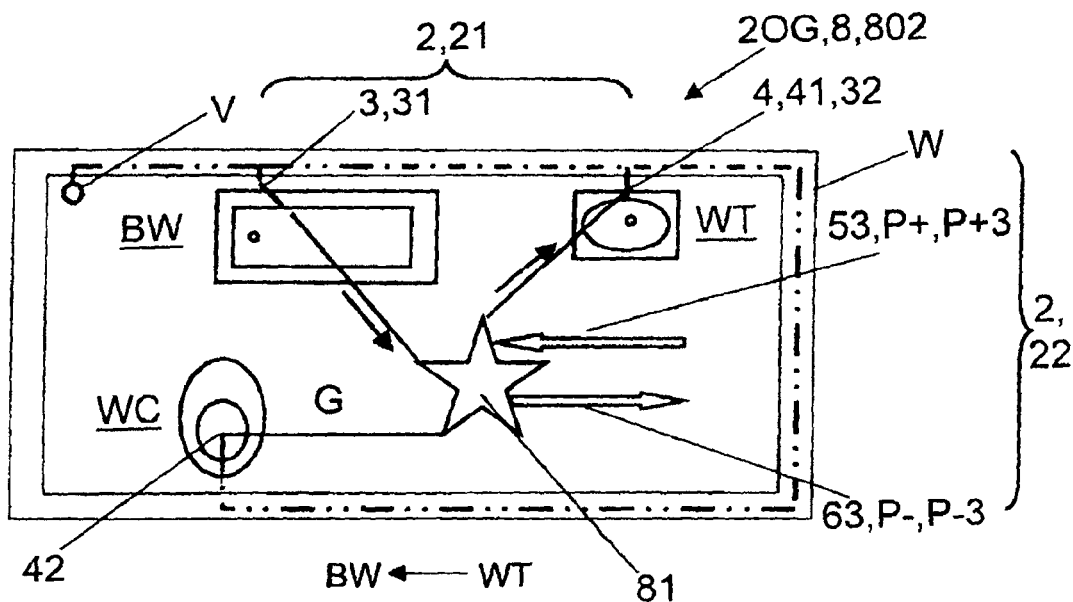

After that, in accordance with FIG. 7b, the direction of the flow of the dedusting fluid 53, 63 is reversed within the first part-system 21 by pressurizing now the second connection 41 of the first part-system 21 with the first dedusting fluid 53 being provided under the dedusting over-pressure $P_{+3}$, while at the same time the first connection 31 of the first part-system is pressurized by the second preparation fluid 63 being provided under the dedusting low-pressure $P_{-3}$.

Due to the fact that according to the new dedusting process the part-systems 2, 21, 22, respectively, are passed through by the dedusting fluid 53, 63 in two opposite directions, the pipework system can be dedusted in a particular effective manner. In particular residues that accumulate for example at a bending of the pipework 1 while blasting the pipework system 1 and thus can not be removed in case that the pipework system 1 is blasted in one direction, only, can be discharged out of the pipework system 1 in the opposite direction by rinsing with the dedusting fluid 53, 63 in the opposite direction.

That is one of the crucial advantages of the new dedusting process, in which dedusting process the direction of the fluid-flow 7 is reversed at least once within a given part-system 2, 21, 22.

Figure 7C:
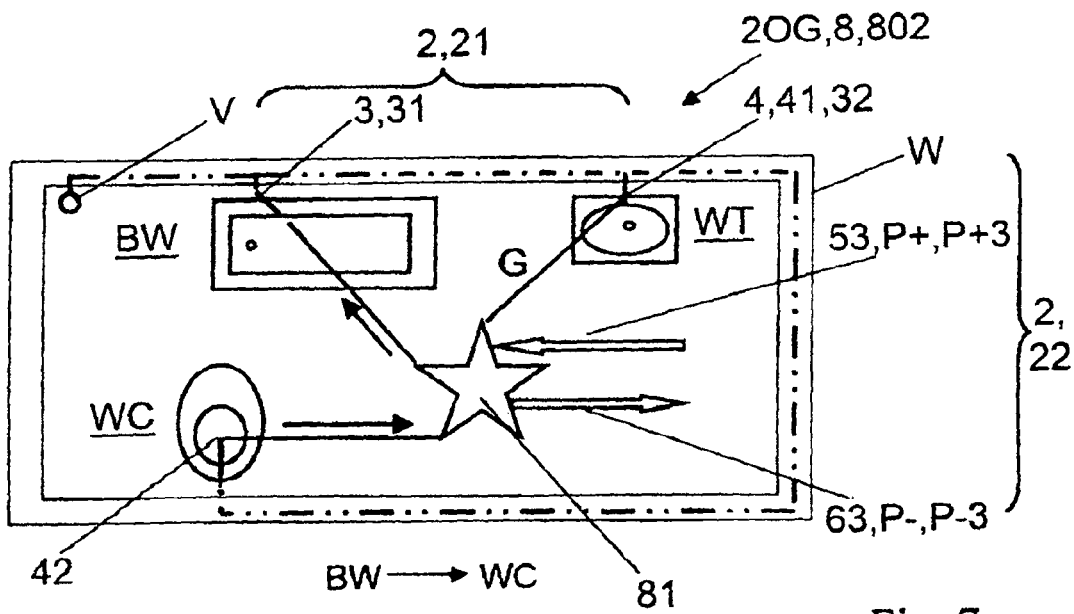
Figure 7D:
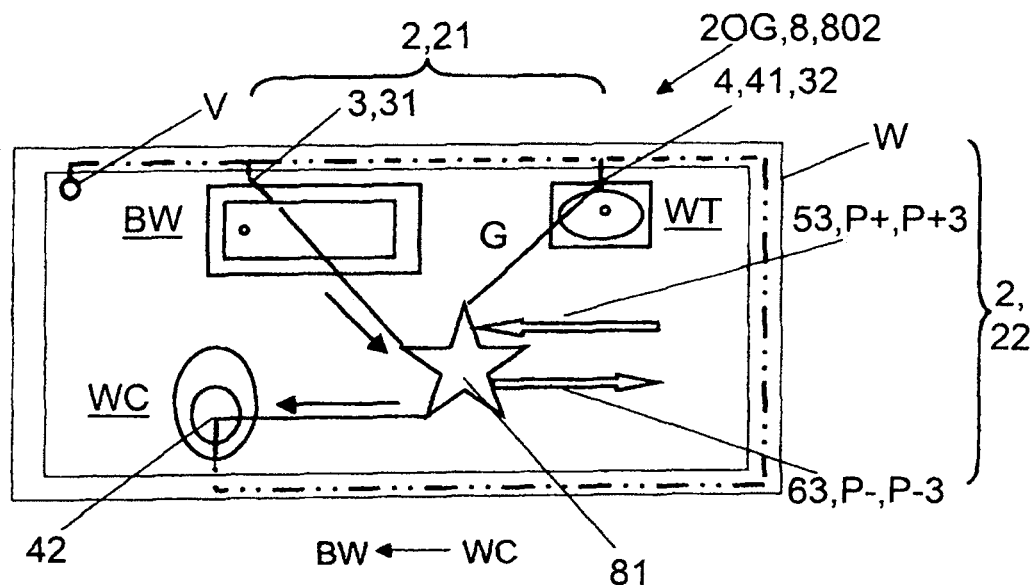

With the help of FIG. 7c and FIG. 7d the next process step is displayed, wherein now perfectly analog the pipework section between the first connection 31 of the bathtub BW and the second connection 42 of the water-closet WC is drained, while the connection 41, 32 is closed off as indicated by G.

Figure 7E:
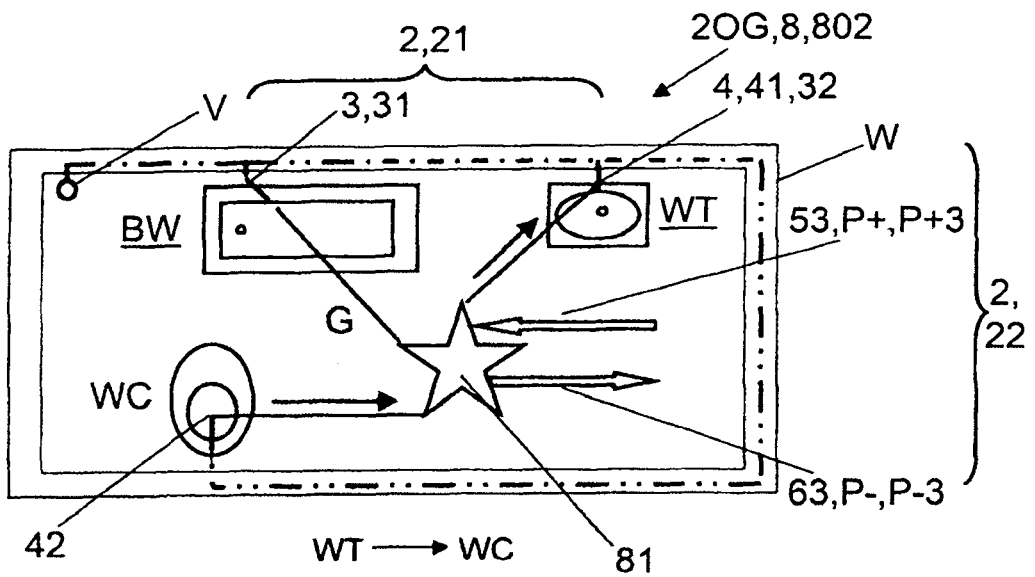
Figure 7F:
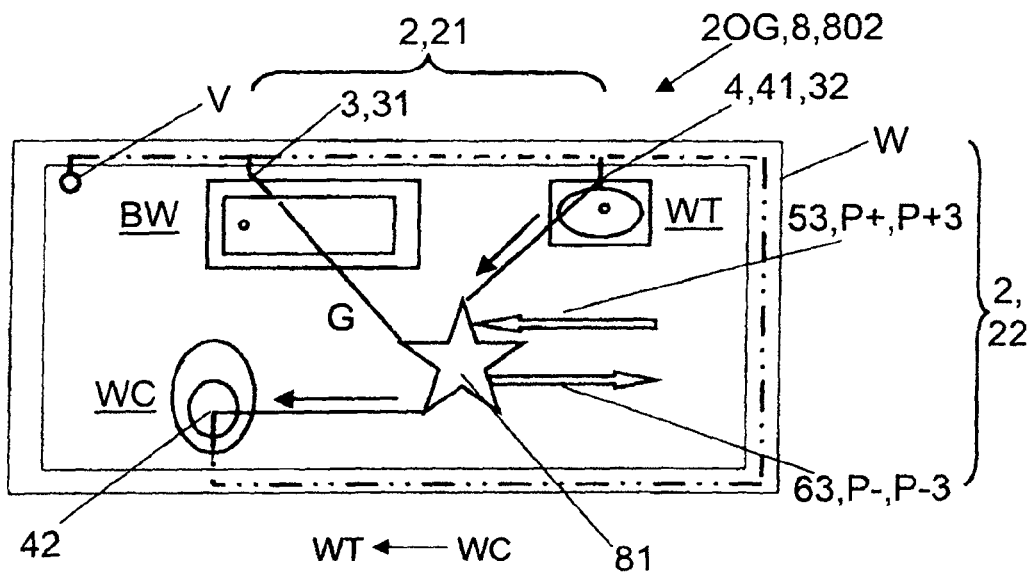
Figure 7G:
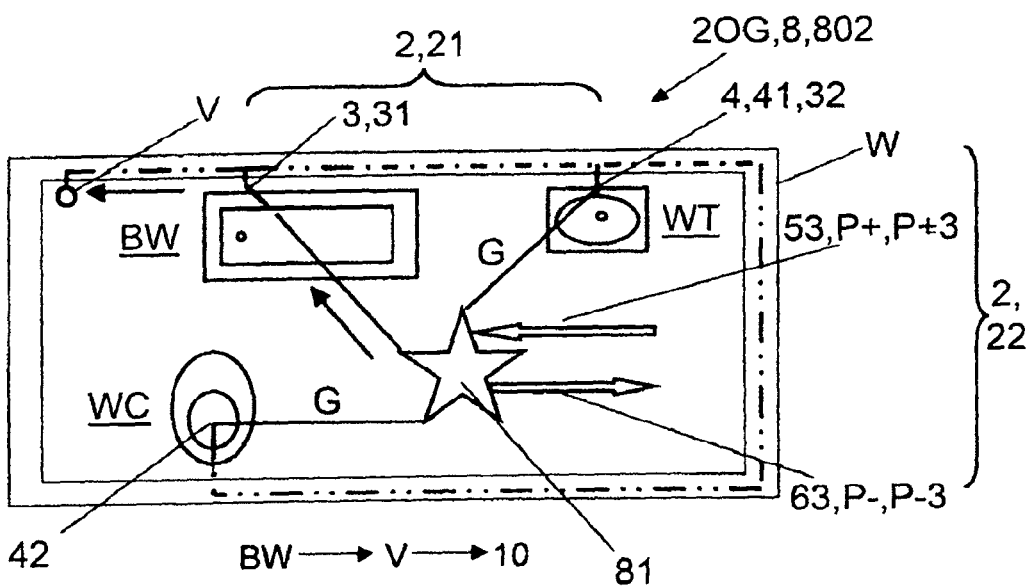

According to FIGS. 7e and 7f the section of the pipework system between the connection 41 of the washbasin WT and the connection 42 of the water-closet 42 are subsequently drained in two opposite directions in the next step by closing off at the same time the connection 31 of the bathtub BW.

The pipework section between the connection 31 of the bathtub BW and the uptake pipe V has not been drained yet at this stage. Thus, according to FIG. 7g the connection 41 at the washbasin WT and the connection 42 of the water-closet WC are closed off and only the connection 31 at the bathtub BW is pressurized by the first dedusting fluid 53 being provided under the dedusting over-pressure $P_{+3}$.

Figure 7H:
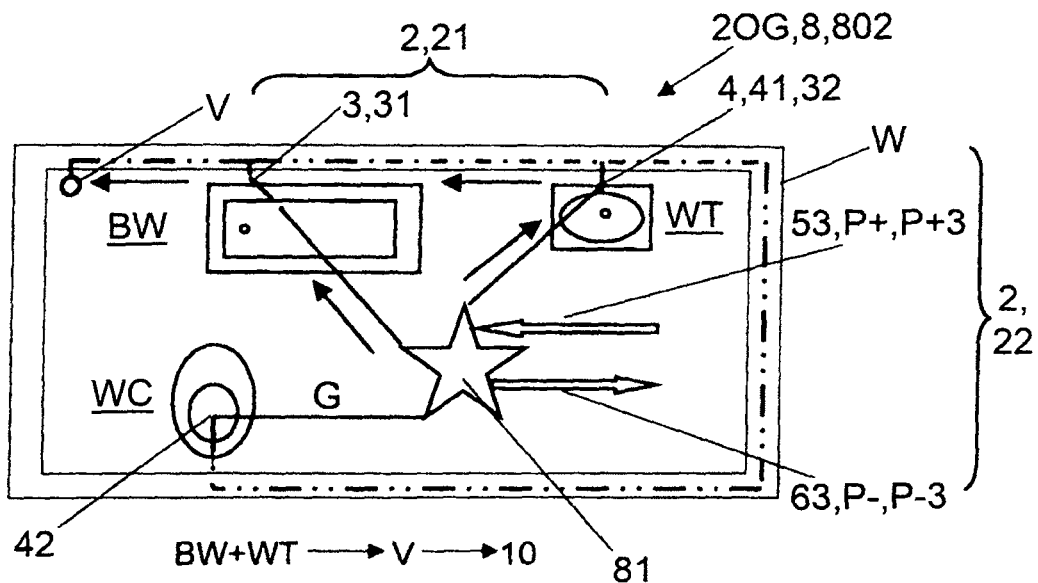
Figure 7I:
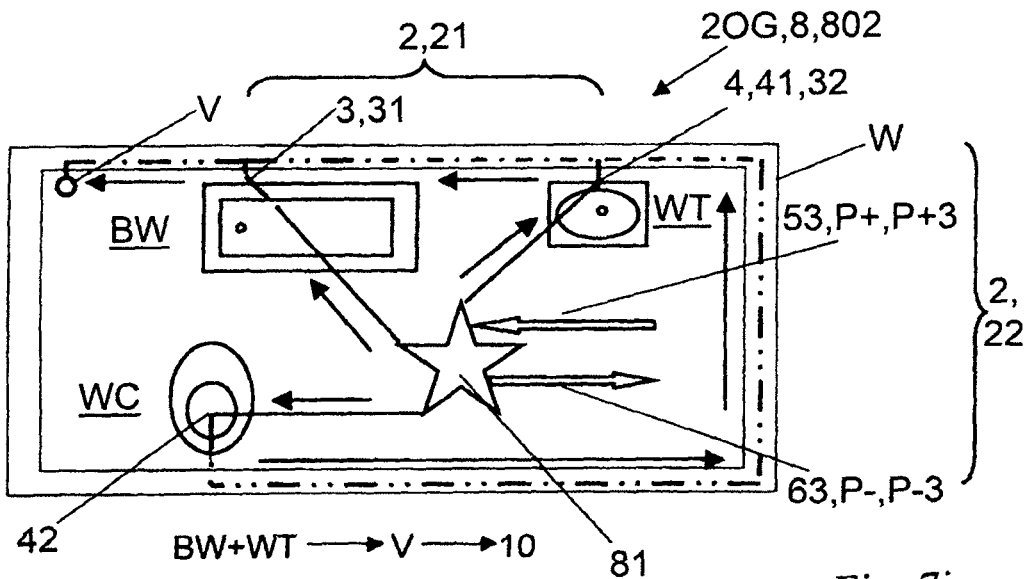

Regarding a last but one step, according to FIG. 7h the connection of the washbasin WT is additionally also pressurized by the dedusting fluid 53 while the connection 42 of the water-closed WC is still remaining closed off, and at last, as displayed with the help of FIG. 7i, all connections 3, 31, 32, 4, 41, 42 of the part-systems 2, 21, 22 of the second upper floor 2OG are pressurized by the first dedusting fluid 53 being provided under the dedusting over-pressure $P_{+3}$, so that a very effective and perfect dedusting of the pipework system 1 is assured in the region of the second upper floor 2OG including the uptake pipe, at least down to the first upper floor 1OG.

Perfectly analog, it is then continued with the dedusting of the pipework system 1 of the subjacent floors through the pipework system 1 is dedusted in all floors.

Finally, the entire pipework system 1 can still held under pressure for a preset period of time, for example for five minutes, and subsequently can be warmed up by means of hot air for the successional coating. Depending on the situation, the warming by means of hot air can take for example ca. 45 min. at a temperature above 37° C. After that, the entire pipework system is depressurized and the pipework system 1 is ready for coating.

As already above mentioned, a frequently given problem when coating the pipework system 1 of buildings is that no building plans for the sanitary pipeline system 1 are available. And even if such building plans are available, the pipes R are very often installed different from that shown in the building plans. Regarding the coating processes known so far, this can have the consequence, as above already explained in great detail, that some pipe sections are not coated, or that too much epoxy resin is supplied into the pipes R due to the ignorance of the course of the pipes, leading to a reduction or even to a plugging of the pipes R.

If the coating process in accordance with the invention is correctly used, the aforementioned errors are basically not possible, since the process in accordance with the invention leads quasi automatically and in a controlled manner to a perfect coating of the entire pipework system 1.

Figure 8A:
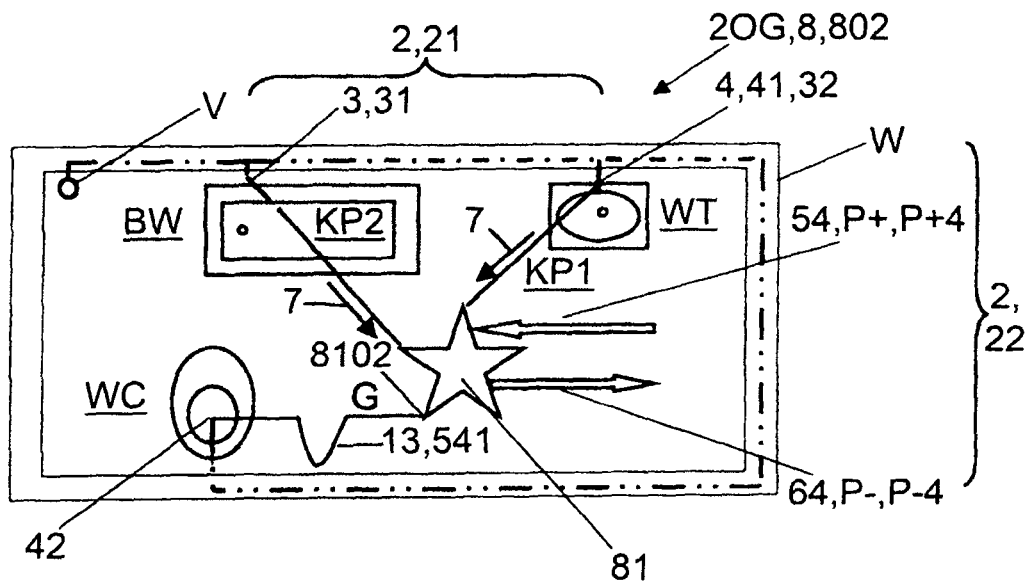
FIG. 8a-8n a coating process in accordance with the invention.
Figure 8B:
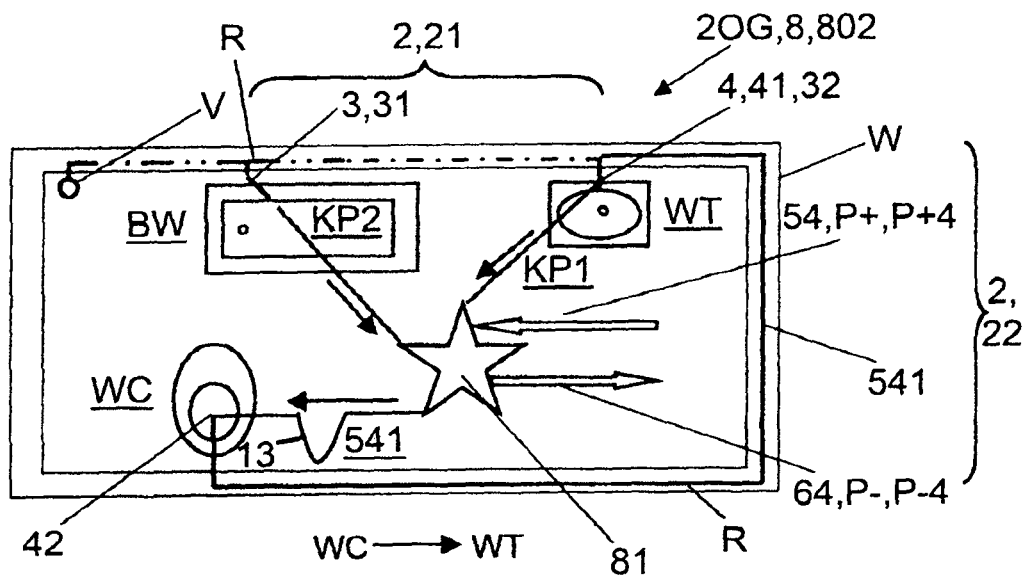
Figure 8C:
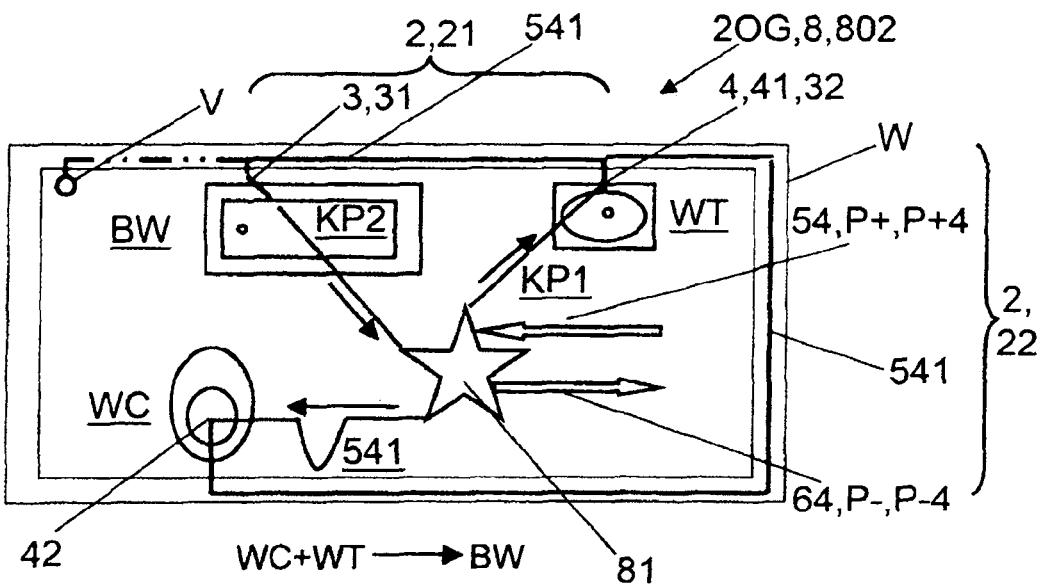
Figure 8D:
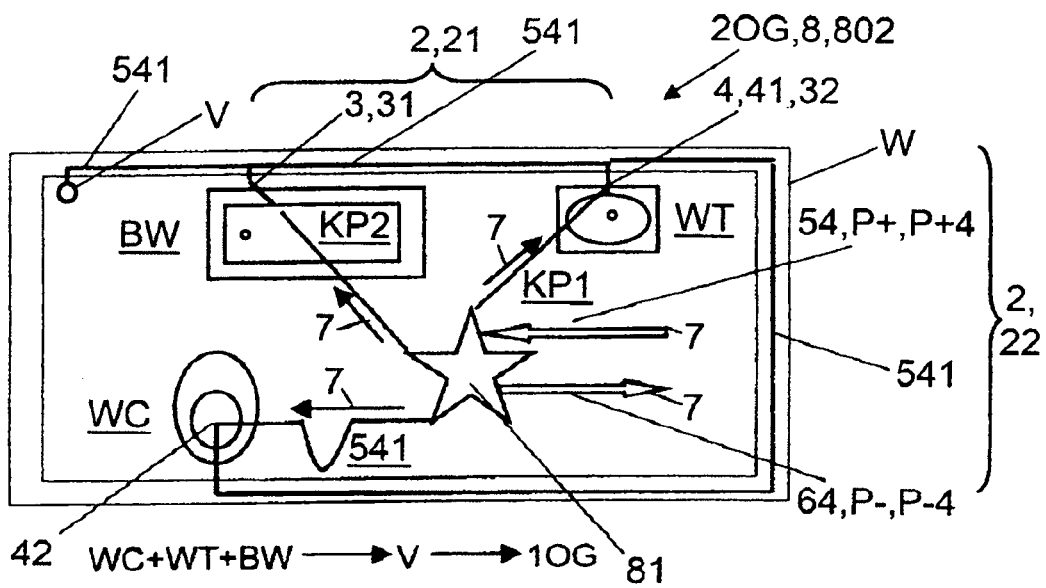
Figure 8E:
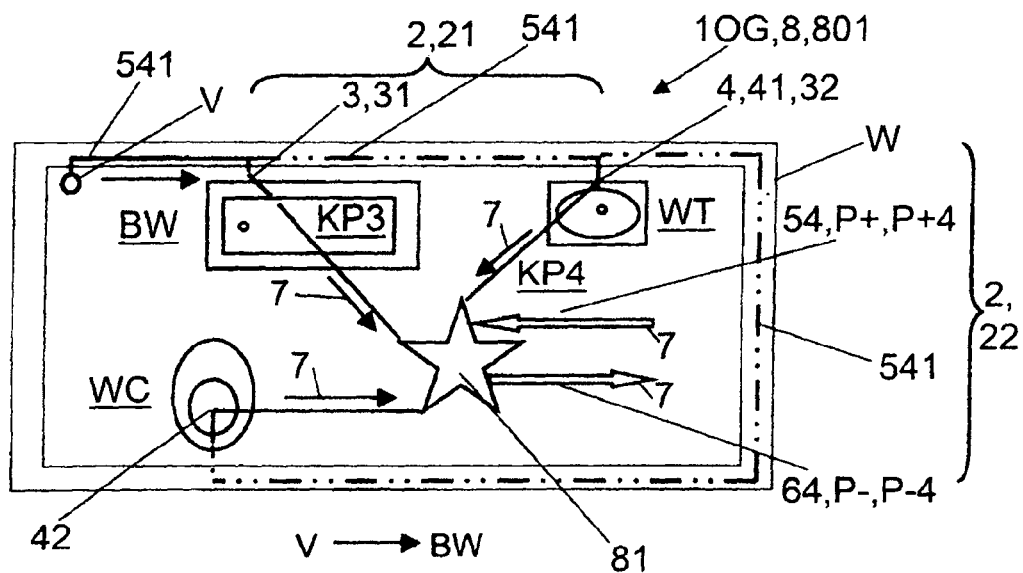
Figure 8F:
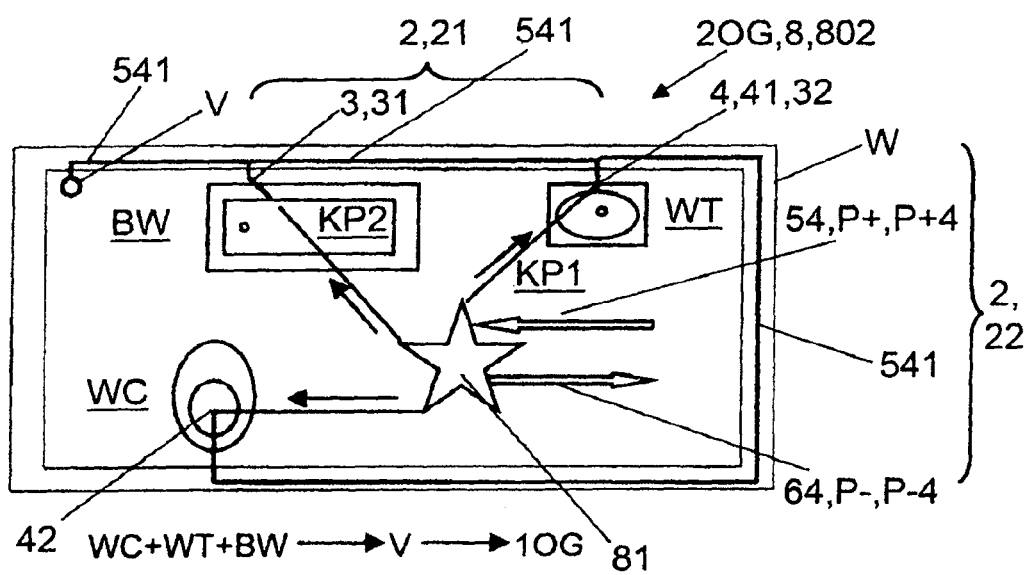
Figure 8G:
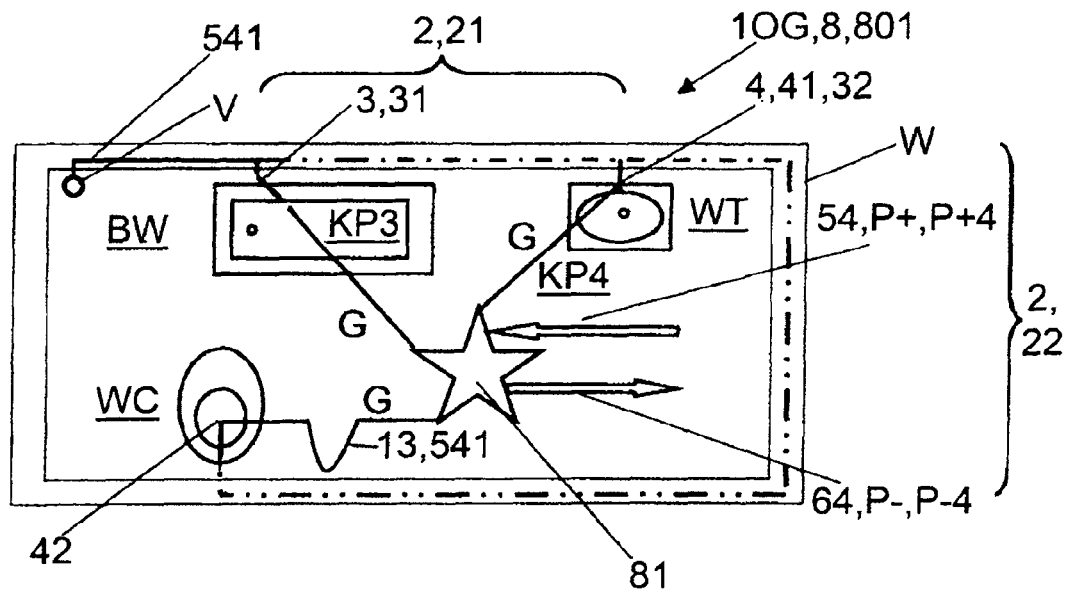
Figure 8H:
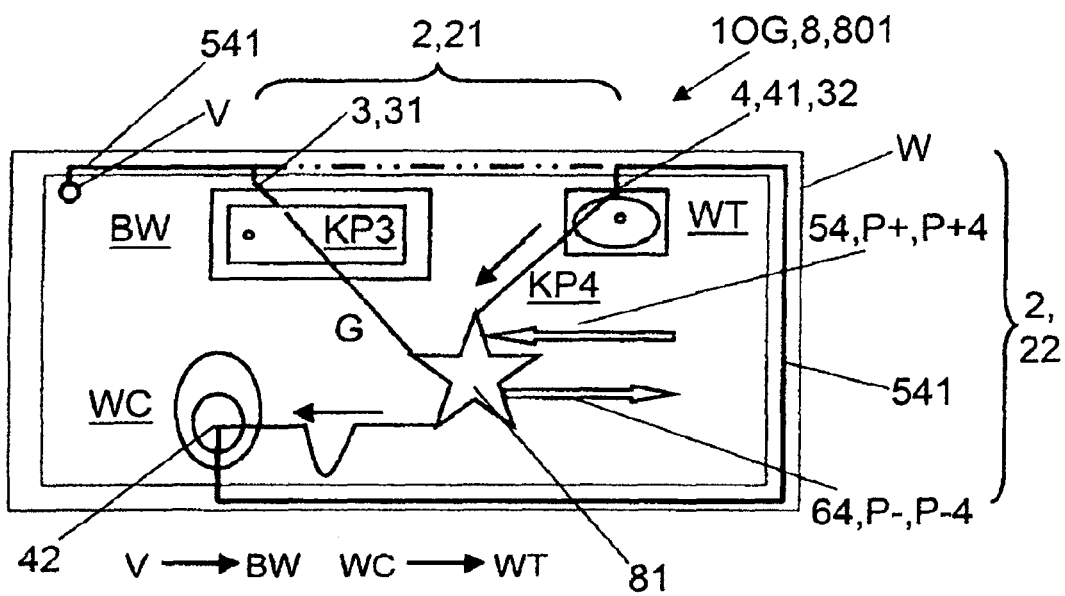
Figure 8I:
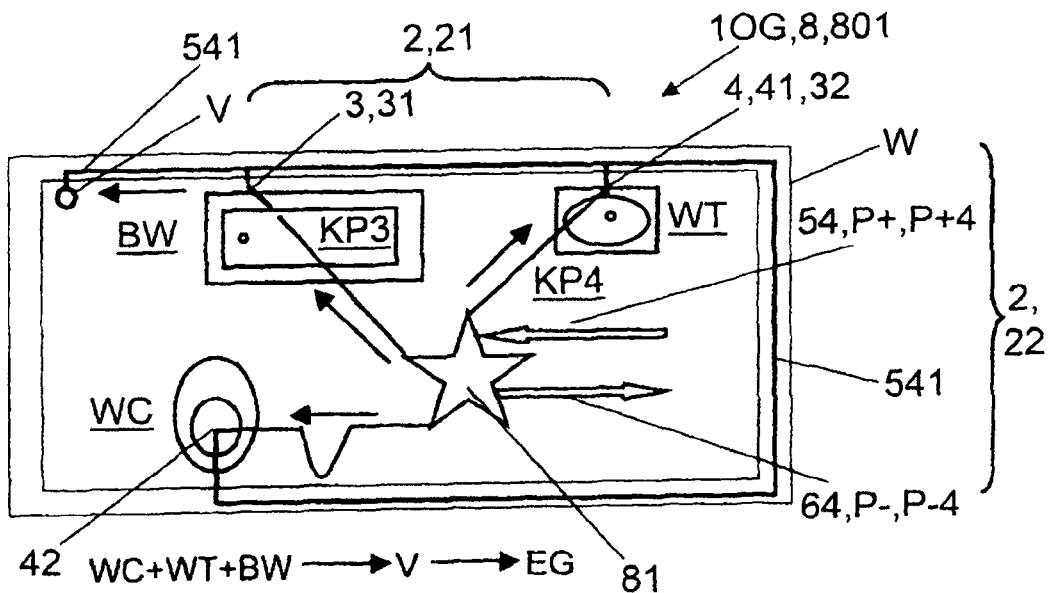
Figure 8J:
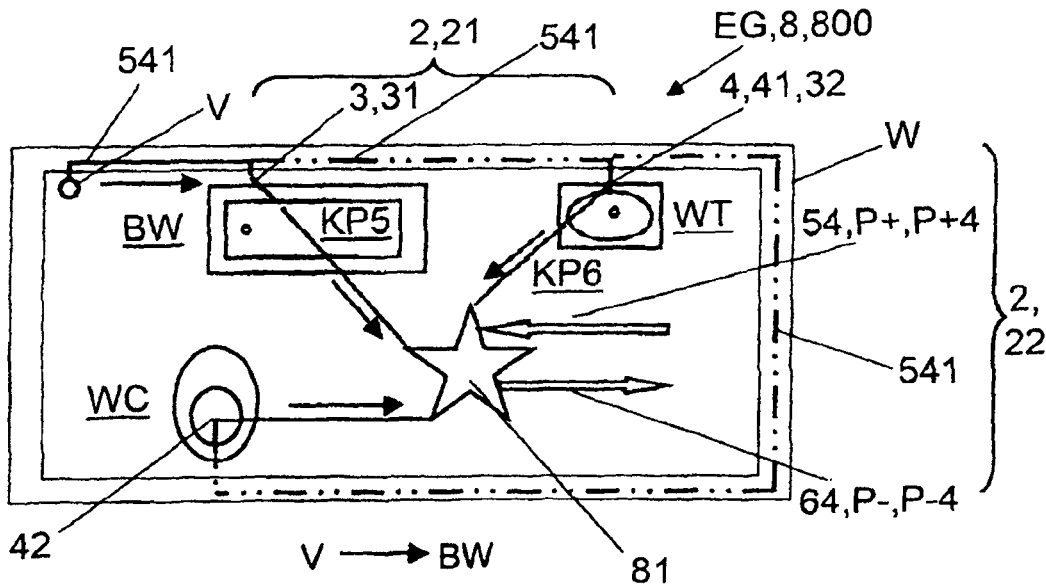
Figure 8K:
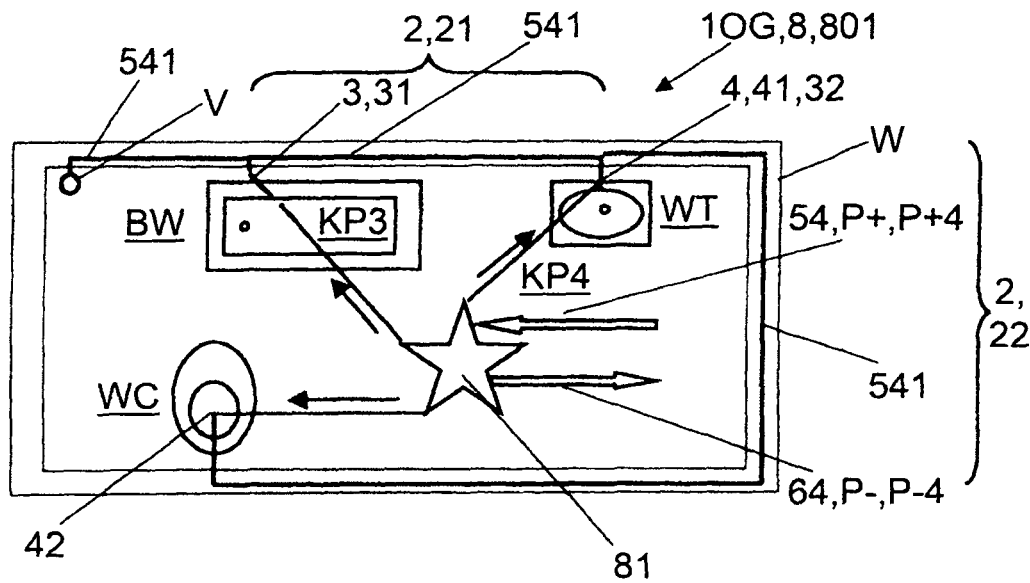
Figure 8L:
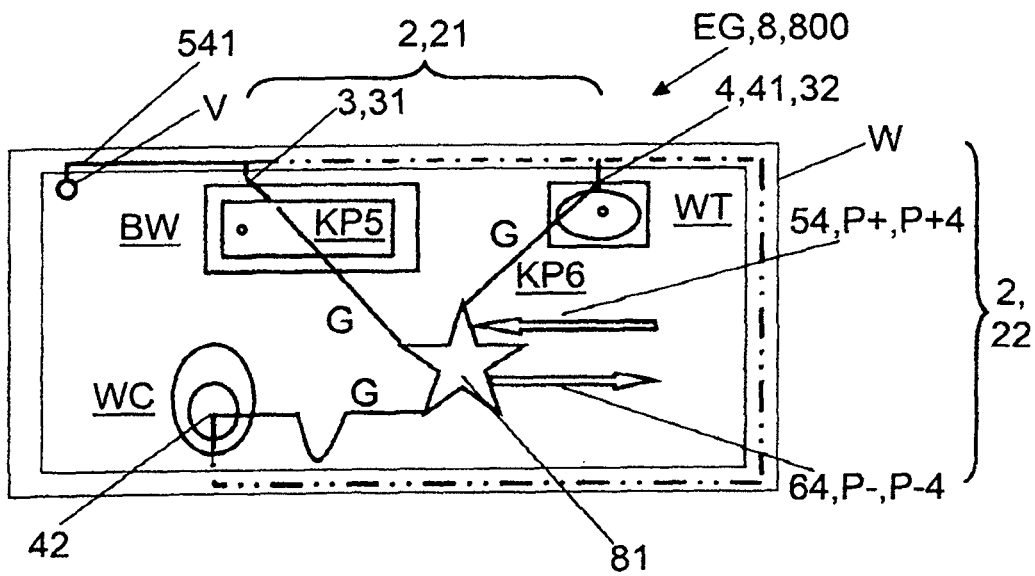
Figure 8M:
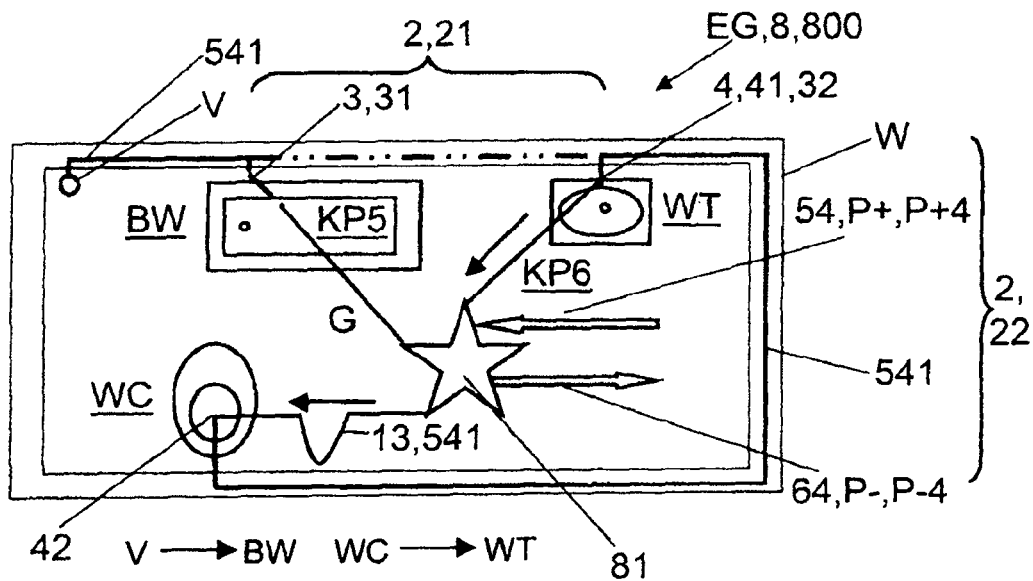
Figure 8N:
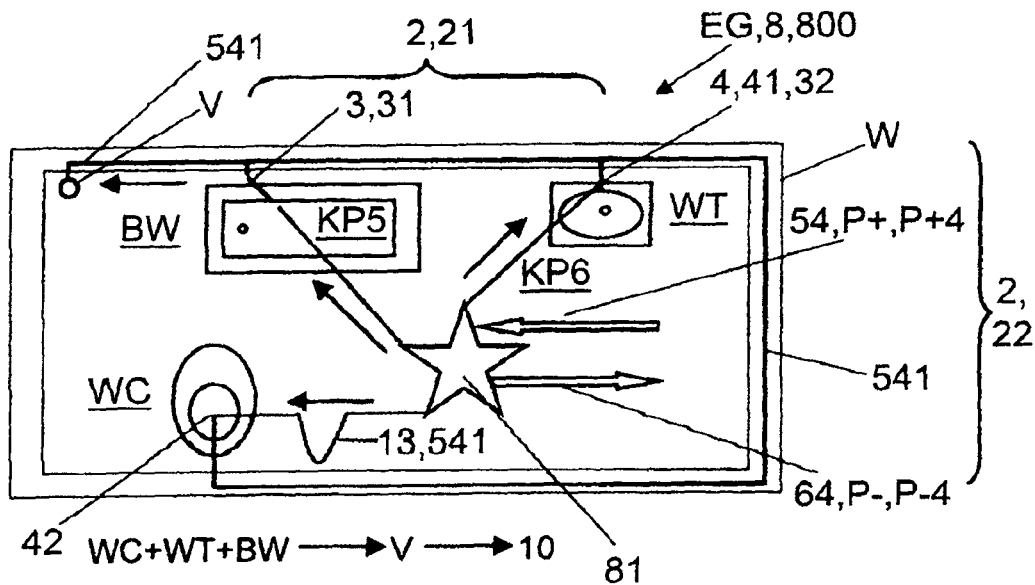

In order to demonstrate that, a preferred embodiment is described in great detail with the help of FIG. 8a to FIG. 8n, which embodiment is very important in practice.

The coating of the pipework system 1 preferably, but not necessarily starts in the topmost floor of the building, in the present example in the second upper floor 2OG.

Before the actual start of the coating process in accordance with the invention, at first a storage tank 13, preferably a storage hose 13 containing a coating material 541 that is in the present example an epoxy resin 541, is provided between the connection 42 at the water-closet WC and an over-pressure outlet 8102 of the distributor 81 for a plumbing unit. At first, the interconnection to the connection 42 is still closed off so that the storage hose 13 is not yet pressurized by the pressure fluid 54 being provided under the coating over-pressure $P_{+4}$. Both the other connections 3, 31, 4, 41, 32 are pressurized via the distributor 81 for a plumbing unit by the pressure fluid 64 being provided under the coating low-pressure $P_{-4}$ as indicated by arrows 7.

After having done these preparatory measures the actual coating process can be started.

According to FIG. 8b, the storage 13 containing the coating material 541 is now pressurized by the first pressure fluid 54 with the coating over-pressure $P_{+4}$, so that the coating material is pressed or blown into the second part-system 2, 22 via the connection 42 and so that the inner surface of the pipe R is coated with the coating material in manner as per se known. At the same time, the coating low-pressure $P_{-4}$ is acting at the connection 3, 31 of the bathtub BW and at the connection 4, 41, 32 of the washbasin WT, so that on the one hand the blowing-in of the coating material 541 is supported by sucking via the connection 42 at the water-closet WC, and wherein on the other hand the pipework sections R that are not to be coated yet, are freed from unwanted matter, for example from gases or drops of the coating material or from a pollutant or from other unwanted matter which possibly may be still present, which are then sucked out via the distributor 81 for the plumbing unit and via the staircase-air-distributor 80, and for example deposited in a separator 12 or a cyclone filter 121 and appropriately disposed.

As usual, the arrows thereby indicate in all Figures the direction of the fluid-flow 7 within the pipework system 1.

A first checkpoint KP1 is provided at the connection 4, 41, 32 of the washbasin WT, at which checkpoint it is monitored or detected with the help of a detection means when the coating material 541 leaves out of the connection 4, 41, 32 or when it reaches the first checkpoint KP1, respectively. The detection means can be for example any electronic sensor being suited for reliably detecting the coating material. For example an optical sensor, an ultrasonic sensor, a capacitive or an inductive sensor, a sensor for measuring a conductivity or any other sensor. In case that a complete automation of the process in accordance with the invention is not necessary, the detection means may be simply a piece of transparent hose, so that a person being located at the first checkpoint KP1 is able to monitor the leaving of the coating material out of the connection 4, 41, 32 and so that he can initiate the further process steps.

Again, It shall be explicitly mentioned here that the process in accordance with the invention can be completely automated, too. And, indeed, not only the coating process itself, but starting with the draining, desiccation, sand blasting, dedusting and finally the concluding coating, the entire process flow from the start until the end can be automated, if only at the respective locations of the working equipment in accordance with the invention, the necessary detectors, automatic valves and switching means and further automatically operable components are used, which are per se freely available or which can be relatively simply made with the help of the knowledge of the person skilled in the art. The person skilled in the art understands immediately, which necessary automatically operable system components are concerned and at which locations they must be provided within the system. In case that these system components are connected to an open loop control and/or to a closed loop control preferably comprising an electronic data processing installation, all processes described in the framework of this application can be automatically carried out either individually or in any combination, by what staff and costs can be saved to a huge amount. What is more, by using this mistake by the operation staff is nearly completely excluded.

After having detected the leaving-out of the coating material 541 at the first checkpoint KP1, it is guaranteed that the second part-system 2, 22, that is the pipe section R between the connection 42 of the water-closet WC and the connection 4, 41, 32 is completely coated.

In order to continue the coating of the part-system 2, 21 between the connection 4, 41, 32 of the washbasin WT and the connection 3, 31 of the bathtub BW, at which a second checkpoint KP2 is provided, in accordance with FIG. 8c, the connection 4, 41, 32 of the washbasin WT is in addition to the connection 42 of the water-closet WC now also pressurized by the pressure fluid 54 being provided under the coating over-pressure $P_{+4}$, and the coating process is continued as long as a leaving of the coating material out of the connection 3, 31 is noticed or detected at the checkpoint KP2 being provided at the bathtub BW.

After that, as shown by FIG. 8d and FIG. 8e, for the continuation of the coating of the pipe section R from the connection 3, 31 via the uptake pipe V to the third checkpoint KP3 in the first upper floor 1OG, the connection 3, 31 in the second upper floor 2OG is in addition also pressurized by the pressure fluid 54 being provided under the coating over-pressure $P_{+4}$, and in the subjacent first upper floor 1OG all connections 3, 31, 4, 41, 32, 42 of the part-systems 2, 21, 22 of the first upper floor 1OG are pressurized by the pressure fluid 64 being provided under the coating low-pressure $P_{-4}$ as indicated by the arrows 7, so that the coating material 541 is sucked from the second upper floor 2OG via the uptake pipe V to the checkpoint KP3, that is provided at the connection 3, 31 of the bathtub BW in the first upper floor 1OG.

As soon as a leaving of the coating material 541 is discovered or detected out of the connection 3, 31 in the first upper floor 1OG, that is at the third checkpoint KP3 in the first upper floor 1OG at the bathtub BW, all connection 3, 31, 4, 41, 32, 42 of both part-systems 2, 21, 22 in the first upper floor 1OG are closed off as displayed with the help of FIG. 8g and a storage tank 13 containing coating material 541 is provided at the point being furthermost from the uptake pipe V, that is at the connection 42 of the water-closet WC, perfectly analog to the course of action done in the second upper floor 2OG at the beginning of the coating process.

In accordance with FIG. 8f, all connections 3, 31, 4, 41, 32, 42 in the second upper floor are still pressurized and still remain being pressurized by the pressure fluid 54 being provided under the coating over-pressure $P_{+4}$ until the end of the entire coating process.

According to FIG. 8h, for the coating of the second part-system 2, 22 in the first upper floor, at first the connection 42 at the water-closet WC is then pressurized by the pressure fluid 54 being provided under the coating over-pressure $P_{+4}$, while the connection 3, 31 of the bathtub is closed off, and for sucking the coating material 541 in, the coating low-pressure $P_{-4}$ is provided at the connection 4, 41, 32.

As soon as the coating material 541 flows out of the connection 4, 41, 32 at the checkpoint KP4 being provided at the washbasin in the first upper floor 1OG, in accordance with FIG. 8i, all connections 3, 31, 4, 41, 32, 42 are pressurized by the pressure fluid 54 being provided under the coating over-pressure $P_{+4}$, so that the coating process can be continued in the first floor EG.

In accordance with FIG. 8j, in the first floor EG, at first all connections 3, 31, 4, 41, 32, 42 of both part-systems 2, 21, 22 of the first floor EG are pressurized by the pressure fluid 64 being provided under the coating low-pressure $P_{-4}$, so that the coating material can be sucked via the uptake pipe V from the first upper floor 1OG to the connection 3, 31 of the bathtub BW of the first floor EG, at which connection 3, 31 a fifth checkpoint KP5 is provided.

According to FIG. 8k, all connections 3, 31, 4, 41, 32, 42 in the second upper floor 1OG still remain being pressurized by the pressure fluid 54 being provided under the coating over-pressure $P_{+4}$.

As soon as a leaving of the coating material 541 is discovered or detected out of the connection 3, 31 in the first floor EG, that is at the fifth checkpoint KP5 in the first floor EG at the bathtub BW, all connection 3, 31, 4, 41, 32, 42 of both part-systems 2, 21, 22 in the first floor EG are closed off as displayed with the help of FIG. 8l and a storage tank 13 containing coating material 541 is provided at the point being furthermost from the uptake pipe V, that is at the connection 42 of the water-closet WC, perfectly analog to the course of action done in the first upper floor 1OG and in the second upper floor 2OG at the beginning of the coating process.

According to FIG. 8m, for the coating of the second part-system 2, 22 in the first floor EG, at first the connection 42 at the water-closet WC is then pressurized by the pressure fluid 54 being provided under the coating over-pressure $P_{+4}$, while the connection 3, 31 of the bathtub is closed off, and for sucking the coating material 541 in, the coating low-pressure $P_{-4}$ is provided at the connection 4, 41, 32.

As soon as the coating material 541 flows out of the connection 4, 41, 32 at the checkpoint KP6 being provided at the washbasin in the first upper floor 1OG, in accordance with FIG. 8n, all connections 3, 31, 4, 41, 32, 42 are pressurized by the pressure fluid 54 being provided under the coating over-pressure $P_{+4}$, so that the coating process can be completed in the first floor EG.

After having completed the actual coating process, for baking out the pipework system 1, for a preset period of time, for example for 45 minutes, an air flow having a preset temperature, preferably at 37° C. or higher, is kept up within the pipework system 1. After that, the coating equipment in accordance with the invention is disassembled and the pipework system must harden under surrounding atmosphere and under ambient temperature for a given period of time, for example during 24 hours. Subsequently, all armatures can be re-installed again and the pipework system 1 can be put into operation again.

Figure 9:
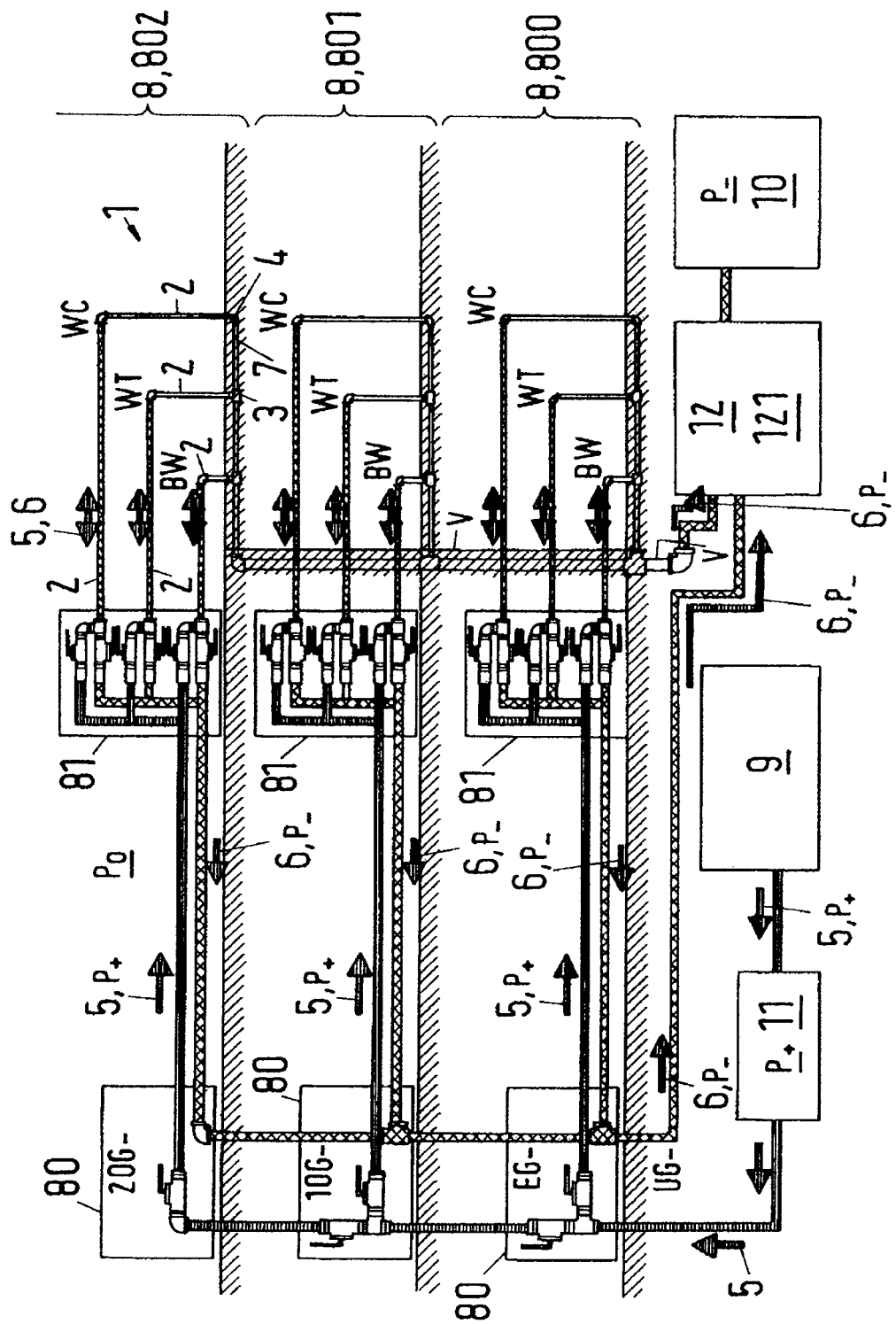
FIG. 9 an overview of an installation of a working equipment according to the invention.

At last, the working equipment in accordance with the invention shall be schematically explained by the help of an example according to FIG. 9 being related to an installation in a building having four floors with a basement UG, a first floor EG, a first upper floor 1OG and a second upper floor 2OG.

A special embodiment of a working equipment in accordance with the invention according to FIG. 9, includes preferably a plurality of sub-distributors 81 being preferably located near to the connections 3, 4 within the different plumbing units and serving for the providing of the first working fluid 5, 51, 52, 53, 54 being provided under the over-pressure $P_+$, $P_{+1}$, $P_{+2}$, $P_{+3}$, $P_{+4}$, and the second working fluid 6, 61, 62, 63, 64 being provided under the low-pressure $P_-$, $P_{-1}$, $P_{-2}$, $P_{-3}$, $P_{-4}$ at a connection 3, 31, 32, 4, 41, 42 of a part-system 2, 21, 22 in a sub-system 8, 801, 802, 803, that is in the present case on one of the floors EG, 1OG, 2OG.

The first working fluid 5, 51, 52, 53, 54 being provided under the over-pressure $P_+$, $P_{+1}$, $P_{+2}$, $P_{+3}$, $P_{+4}$ is preferably provided by a compressor 9 or can also be provided for example by a over-pressure reservoir 9, wherein the second working fluid 6, 61, 62, 63, 64 being provided under the low-pressure $P_-$, $P_{-1}$, $P_{-2}$, $P_{-3}$, $P_{-4}$ is provided by a vacuum machine 10 or by a low-pressure reservoir 10.

Thereby, the first working fluid 5, 51, 52, 53, 54 is led from the compressor via pressure lines to the main-distributors 80, which are here staircase-air-distributors 80, and from there supplied via an over-pressure connecting line to the associated air-distributor 81 for a plumbing unit.

In analog, the second working fluid 6, 61, 62, 63, 64 is led from the vacuum machine via low-pressure lines to the staircase-air-distributors 80, too, and from there supplied via an low-pressure connecting line to the associated air-distributor 81 for a plumbing unit.

That is, the main-distributors 80 and the sub-distributors 81 are preferably designed in such a way that via separate low-pressure chambers and over-pressure chambers being provided within the distributors, the first working fluid 5, 51, 52, 53, 54 being provided under the over-pressure and the second working fluid 6, 61, 62, 63, 64 being provided under the low-pressure, can be distributed by one and the same distributor at the same time.

It is understood that for the distribution also main-distributors and/or sub-distributors can be used, that can only distribute the first working fluid 5, 51, 52, 53, 54 being provided under the over-pressure or can only distribute the second working fluid 6, 61, 62, 63, 64 being provided under the low-pressure.

As can be seen in FIG. 9, the main-distributor 80 is preferably supplied in the operation state by an air control station 11 for the setting and/or the regulation of the over-pressure $P_+$, $P_{+1}$, $P_{+2}$, $P_{+3}$, $P_{+4}$ of the first working fluid 5, 51, 52, 53, 54.

Especially due to antipollution reasons, in accordance with FIG. 9 a water separator 12 and a cyclone filter 121 is provided for separating a fluid, in particular for separating water, oil, an epoxy resin and/or for separating particles, in particular abrasive particles, especially for separating sand, and/or for separating an other environment-friendly or not environment-friendly material, wherein the water separator 12 and the cyclone filter 121 are provided between the vacuum machine 10 and the sub-distributor 81.

Figure 10:
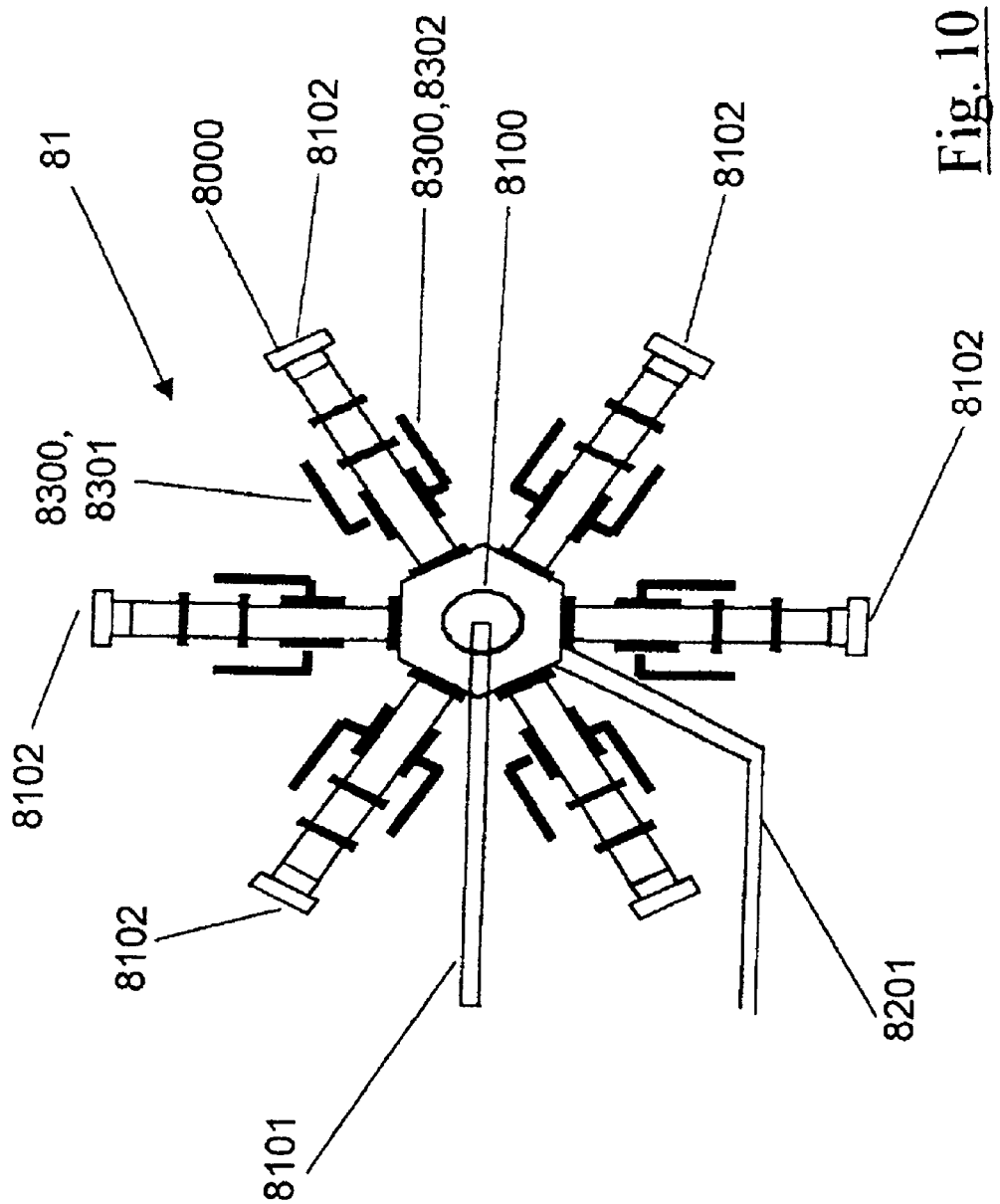
FIG. 10 a distributor for a plumbing unit according to the invention.
Figure 11:
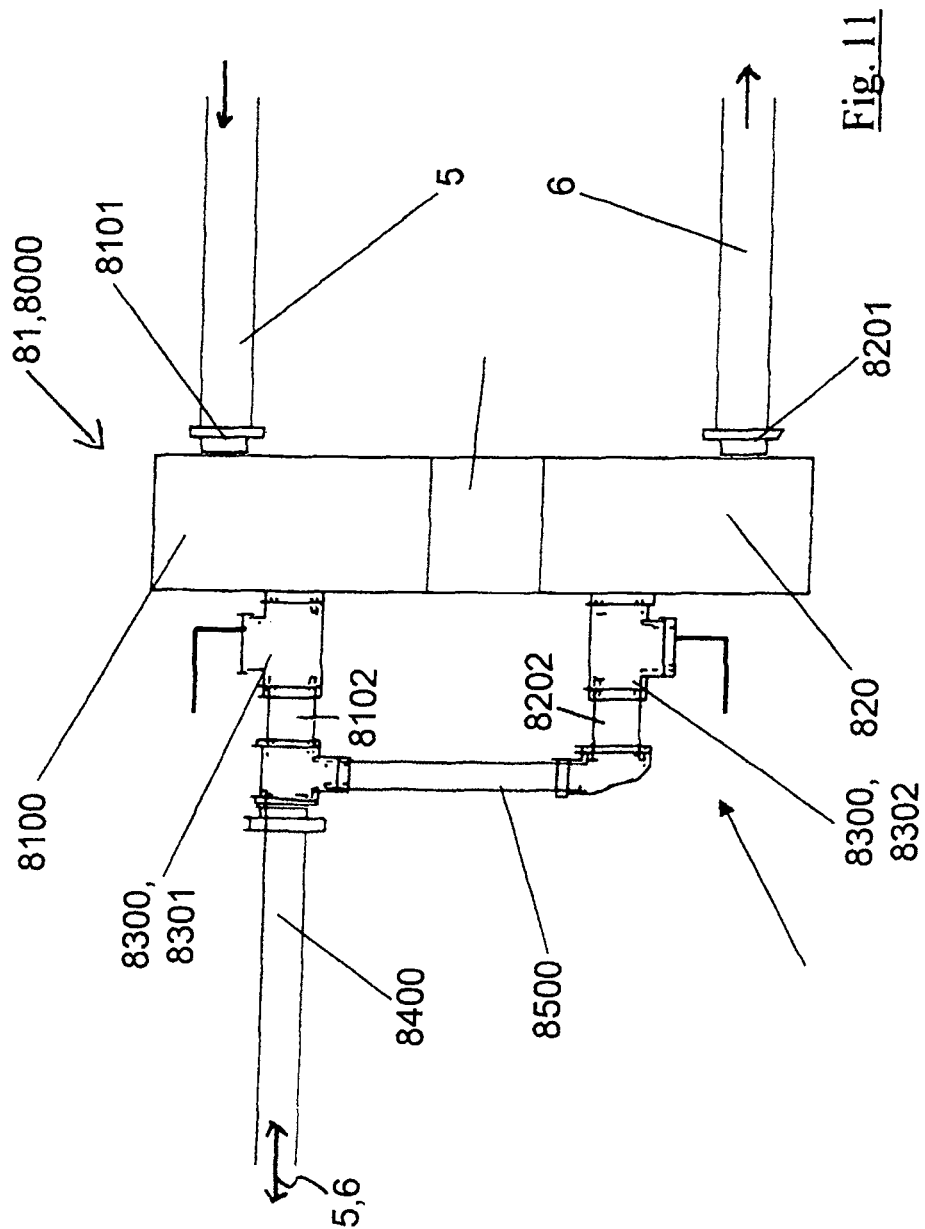
FIG. 11 a sectional view of the distributor for a plumbing unit according to FIG. 10.

Finally, FIG. 10 and FIG. 11 show a particularly preferred embodiment of a sub-distributor 81 in accordance of the invention, that is especially an air-distributor 81 for a plumbing unit, and shall be described in the following in detail. For a better understanding, it is simultaneously referred to FIG. 11 showing a sectional representation of a connecting device 8000.

The sub-distributor of the example in accordance with FIG. 10 includes both an over-pressure chamber 8100 having an over-pressure inlet 8101 for pressurizing the over-pressure chamber 8100 with a first working fluid 5, 51, 52, 53, 54 provided under an over-pressure $P_+$, $P_{+1}$, $P_{+2}$, $P_{+3}$, $P_{+4}$ as well as a low-pressure chamber 8200 that cannot be seen here in the view according to FIG. 10, the low-pressure chamber 8200 having a low-pressure inlet 8201 for pressurizing the low-pressure chamber 8200 with a second working fluid 6, 61, 62, 63, 64 provided under a low-pressure $P_-$, $P_{-1}$, $P_{-2}$, $P_{-3}$, $P_{-4}$.

Provided is a total of six equal connecting devices 8000 for the connection of a part-system 2, 21, 22 as described above. Each connecting device 8000 includes both an over-pressure outlet 8102 for providing the first working fluid 5, 51, 52, 53, 54 to a connection 3, 31, 32, 4, 41, 42 of a part-system 2, 21, 22 in a sub-system 8, 800, 801, 802, as well as a low-pressure outlet 8202 for providing the second working fluid 6, 61, 62, 63, 64 to a connection 3, 31, 32, 4, 41, 42 of the part-system 2, 21, 22 in the sub-system 8, 800, 801, 802.

Thereby, in accordance with the invention, in the present example a switching means 8300 is provided that is realized by mechanical cut-off cocks 8300, 8301, 8302 in combination with a conjoint outlet adaptor 8500, as can be seen best by FIG. 11. Using the switching means 8300 in accordance with the invention, a pressure line 8400 being connected to the sub-distributor 81 can alternatively be pressurized by the first working fluid 5, 51, 52, 53, 54 or by the second working fluid 6, 61, 62, 63, 64, respectively.

The person skilled in the art understands that the embodiments of the invention described in the present application must be understood exemplarily, only, and depending on the utilization, can be combined in every suitable manner, and that the process steps or system components in accordance with the invention, respectively, all described in detail, can also be absent regarding special embodiments, or can be run or can be assembled, respectively, in an other order or can also be completed by further, not explicitly described steps or components.

The numerous advantages of the invention are thereby obvious. Even in case that the process in accordance with the invention is note completely automated, after its installation, the entire equipment can be operated by one single operator, only. The blasting material and above all the coating material can be dosed very exactly, in a quasi automatic manner. Through the sand blasting in two directions, the impact on the pipes is reduced to about half the load, in particular the dreaded shooting through at the bendings is avoided. What is more, the blasting in two directions has turned out to be much more effective than the blasting in only one direction, so that in addition the overall blasting time is reduced leading as a result to a saving of blasting material, too. The number of working pipes that must be installed is significantly reduced and a plugging of the working pipes by the blasting material or the coating material does no longer happen. The parts of the equipment such as the sand blasting apparatus and so on can be centrally operated by a single person, so that communication devices for the operating staff is also no longer necessary and, thus, consultations between the operating staff become also superfluous, so that failures due to communication errors are automatically avoided.

The invention claimed is:

1. Coating process for the coating of an interior of a pipework system with a coating material, for the coating with an epoxy resin, which pipework system includes a subsystem having a first part-system between a first connection of the first part-system and a second connection, and a second part-system being coupled to the first part-system, wherein the part-system can be pressurized by a pressure difference via a first connection of the second part-system and via a second connection of the second part-system, and wherein the first connection of the second part-system is the second connection of the first part-system and the coating process includes in a first process step the following steps in an arbitrary order:

providing a first pressure fluid which first pressure fluid is under a coating over-pressure with respect to an ambient pressure, providing a second pressure fluid which second pressure fluid is under a coating low-pressure with respect to the ambient pressure, providing the coating material in a storage tank, connecting a pressure outlet of the storage tank with the first connection of the first part-system, connecting a pressure inlet of the storage tank with the first pressure fluid being under the coating over-pressure, connecting the second connection of the first part-system with the second pressure fluid being under the coating low-pressure, wherein in a second process step the first part-system is pressurized by a differential pressure by applying via the first connection of the first part-system the first pressure fluid being under the coating over-pressure and, at the same time, by applying via the second connection of the first part-system the second pressure fluid being under the coating low-pressure in such a way that a fluid-flow of the coating material and the first pressure fluid is established through the part-system between the first connection of the first part-system and the second connection of the first part-system in a direction from the first connection to the second connection in such a way, that an inner surface of the part-system is being coated by the coating material, and wherein the second connection of the first part-system is pressurized with the first pressure fluid being under the coating over-pressure after a leaving of the coating material out of the second connection of the first part-system at a checkpoint the leaving of the coating is detected, so that the first part-system and the second part-system is consecutively fed with the coating material via the second connection of the second part-system and wherein a main-distributor is provided for each sub-system, which main-distributor provides the first pressure fluid and/or the second pressure fluid to the assigned sub-system, and wherein the main-distributor is a staircase-air-distributor, and/or wherein a sub-distributor is provided within each sub-system which sub-distributor provides the first pressure fluid and/or the second pressure fluid to the part-system of the sub-system, wherein the sub-distributor is a distributor for a plumbing unit, and/or wherein the sub-distributor is designed in such a way that the first pressure fluid and/or the second pressure fluid can be alternatively and/or switchable provided at an outlet of the sub-distributor.

2. Coating process in accordance with claim 1, wherein the pipework system is a networked pipework system including at least two networked sub-systems, being networked by means of a networking-pipe and the networked sub-systems including at least one part-system, respectively.

3. Coating process in accordance with claim 1, wherein the coating material is provided to the part-systems of a given sub-system by feeding it into the sub-system via that connection of the sub-system, which connection has the biggest distance to a networking-pipe being assigned to the sub-system.

4. Coating process in accordance with claim 1, wherein the second connection of the second part-system is pressurized by the second pressure fluid being provided under the coating low-pressure until a leaving of the coating material out of the second connection of the second part-system is detected, and after that, the second connection of the second part-system is pressurized by the first pressure fluid being provided under the coating over-pressure.

5. Coating process in accordance with claim 1, wherein after the coating of all part-systems of a first subsystem, all connections are pressurized by the first pressure fluid being provided under the coating over-pressure, and the networking-pipe being connected to the sub-system is coated at least as long as a leaving of the coating material out of the networking-pipe is detected at a checkpoint, wherein the networking-pipe is pressurized by the second pressure fluid being provided under the coating low-pressure at a suction side.

6. Coating process in accordance with claim 5, wherein the first sub-system is connected to a further sub-system via the networking-pipe, in which further sub-system all connections of the further sub-system are pressurized by the second pressure fluid being provided under the coating low-pressure, and wherein the networking-pipe is coated until a leaving of the coating material out of a second connection of a part-system of the further sub-system is detected at a checkpoint.

7. Coating process in accordance with claim 1, wherein a detection means is be provided for the detection of the leaving of the coating material, and the detection means is a transparent hose or a detection sensor, an optic, acoustic or an electromagnetic detection sensor, or any combination thereof.

8. Coating process in accordance with claim 1, wherein the first pressure fluid and/or the second pressure fluid is provided to the sub-distributor via the main-distributor.

9. Coating process in accordance with claim 1, wherein before starting the coating process, the entire pipework system is networked with at least all main-distributors, and/or with all sub-distributors and/or with all air control stations and/or with all water separators and/or with all cyclone filters, and/or wherein an electronic data processing installation is provided, wherein at least some of the main-distributors and/or of the sub-distributors and/or of the air control stations and/or of the water separators and/or of the cyclone filters are designed in such a way that the coating process can at least partly be carried out in an automatic and/or program controlled manner.

10. Coating process in accordance with claim 1, wherein before starting the coating process a working process for the treatment of an interior of a pipework system is carried out, which pipework system includes a part-system between a first connection and a second connection, and the working process includes the following working steps:

providing a first working fluid being under an over-pressure with respect to an ambient pressure, providing a second working fluid being under a low-pressure with respect to the ambient pressure, wherein the part-system is pressurized between the first connection and the second connection with the first working fluid provided under the over-pressure and the second working fluid provided under the low-pressure at the same time in such a way that a fluid-flow of the first working fluid provided under the over-pressure is established through the part-system between the first connection of the part-system and the second connection of the part-system in a direction to the second working fluid provided under the low-pressure and wherein in at least one working step the direction of the fluid-flow through the part-system between the first connection and the second connection is reversed at least once.

* * * * *